United States Patent
Tanaka

(10) Patent No.: US 12,026,979 B2
(45) Date of Patent: Jul. 2, 2024

(54) INFORMATION PROCESSING APPARATUS, NONVERBAL INFORMATION CONVERSION SYSTEM, AND INFORMATION PROCESSING METHOD

(71) Applicant: Satomi Tanaka, Kanagawa (JP)

(72) Inventor: Satomi Tanaka, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 17/653,933

(22) Filed: Mar. 8, 2022

(65) Prior Publication Data
US 2022/0301347 A1    Sep. 22, 2022

(30) Foreign Application Priority Data
Mar. 18, 2021 (JP) ................. 2021-044286

(51) Int. Cl.
G06K 9/00 (2022.01)
G06V 20/40 (2022.01)
G06V 40/16 (2022.01)
G06V 40/20 (2022.01)

(52) U.S. Cl.
CPC ........... *G06V 40/176* (2022.01); *G06V 20/46* (2022.01); *G06V 40/28* (2022.01)

(58) Field of Classification Search
CPC ...... G06V 40/176; G06V 20/46; G06V 40/28; G06V 40/20; G06V 40/174; G06F 18/21
See application file for complete search history.

(56) References Cited

U.S. PATENT DOCUMENTS

| 6,549,887 B1* | 4/2003 | Ando | G09B 21/00 704/271 |
| 2010/0003969 A1 | 1/2010 | Isobe et al. | |
| 2021/0043110 A1* | 2/2021 | Jung | G10L 15/24 |
| 2021/0150145 A1* | 5/2021 | Negishi | G06V 10/80 |
| 2021/0390314 A1* | 12/2021 | Baijal | G06F 3/167 |
| 2022/0004809 A1* | 1/2022 | Iyer | G06F 18/40 |

FOREIGN PATENT DOCUMENTS

| JP | 2000-214764 | 8/2000 |
| JP | 2005-041081 | 2/2005 |
| JP | 2006-330958 | 12/2006 |
| JP | 2019-192207 | 10/2019 |
| KR | 101189053 | 10/2012 |
| WO | 2020/204000 | 10/2020 |

OTHER PUBLICATIONS

Extended European Search Report for 22161901.8 dated Aug. 11, 2022.
Tabas Baltrusaitis, et al., "OpenFace: an open source facial behavior analysis toolkit", ICCV 2016.
A. Pumarola, et al., "Ganimation: Anatomically-aware facial animation from a single image", ECCV, 2018.

* cited by examiner

Primary Examiner — Dhaval V Patel

(74) Attorney, Agent, or Firm — IPUSA, PLLC

(57) ABSTRACT

An information processing apparatus includes circuitry. The circuitry estimates an intention indicated in first nonverbal information, which is nonverbal information of a first user, based on a feature amount of the first nonverbal information and a nonverbal expression model indicating a relation between the first nonverbal information and an intention. The circuitry converts the first nonverbal information into second nonverbal information to be output to a second user based on the estimated intention and a set conversion rule of the nonverbal information.

13 Claims, 16 Drawing Sheets

FIG. 8

| INTENTION | INTENSITY | AU1 | AU2 | AU4 | SPINE LANDMARK 1 | SPINE LANDMARK 2 | LINE-OF-SIGHT DIRECTION (RIGHT EYE) | LINE-OF-SIGHT DIRECTION (LEFT EYE) |
|---|---|---|---|---|---|---|---|---|
| Neutral | 1.0 | (1) | (2) | (3) | (4) | (5) | (6) | (7) |
| Neutral | 0.8 | | | | | | | |
| Neutral | 0.5 | | | | | | | |
| Deny | 1.0 | | | | | | | |
| Deny | 0.8 | | | | | | | |
| Deny | 0.5 | | | | | | | |
| Arousal | 1.0 | | | | | | | |
| Arousal | 0.8 | | | | | | | |
| .. | .. | .. | .. | .. | .. | .. | .. | .. |

FIG. 10A

| FN | AU1 | AU2 | AU4 | SPINE LANDMARK 1 | SPINE LANDMARK 2 | LINE-OF-SIGHT DIRECTION (RIGHT EYE) | LINE-OF-SIGHT DIRECTION (LEFT EYE) |
|---|---|---|---|---|---|---|---|
| (1) | (2) | (3) | (4) | (5) | (6) | (7) | |
| 1 | 0.3 | 0.2 | 0.6 | 0.5 | −0.6 | 0.2 | 0.1 |

FIG. 10B

| FN | AU1 | AU2 | AU4 | SPINE LANDMARK 1 | SPINE LANDMARK 2 | LINE-OF-SIGHT DIRECTION (RIGHT EYE) | LINE-OF-SIGHT DIRECTION (LEFT EYE) |
|---|---|---|---|---|---|---|---|
| (1) | (2) | (3) | (4) | (5) | (6) | (7) | |
| 1 | 0.3 | 0.2 | 0.6 | 0.1 | 0.1 | 0.5 | 0.5 |

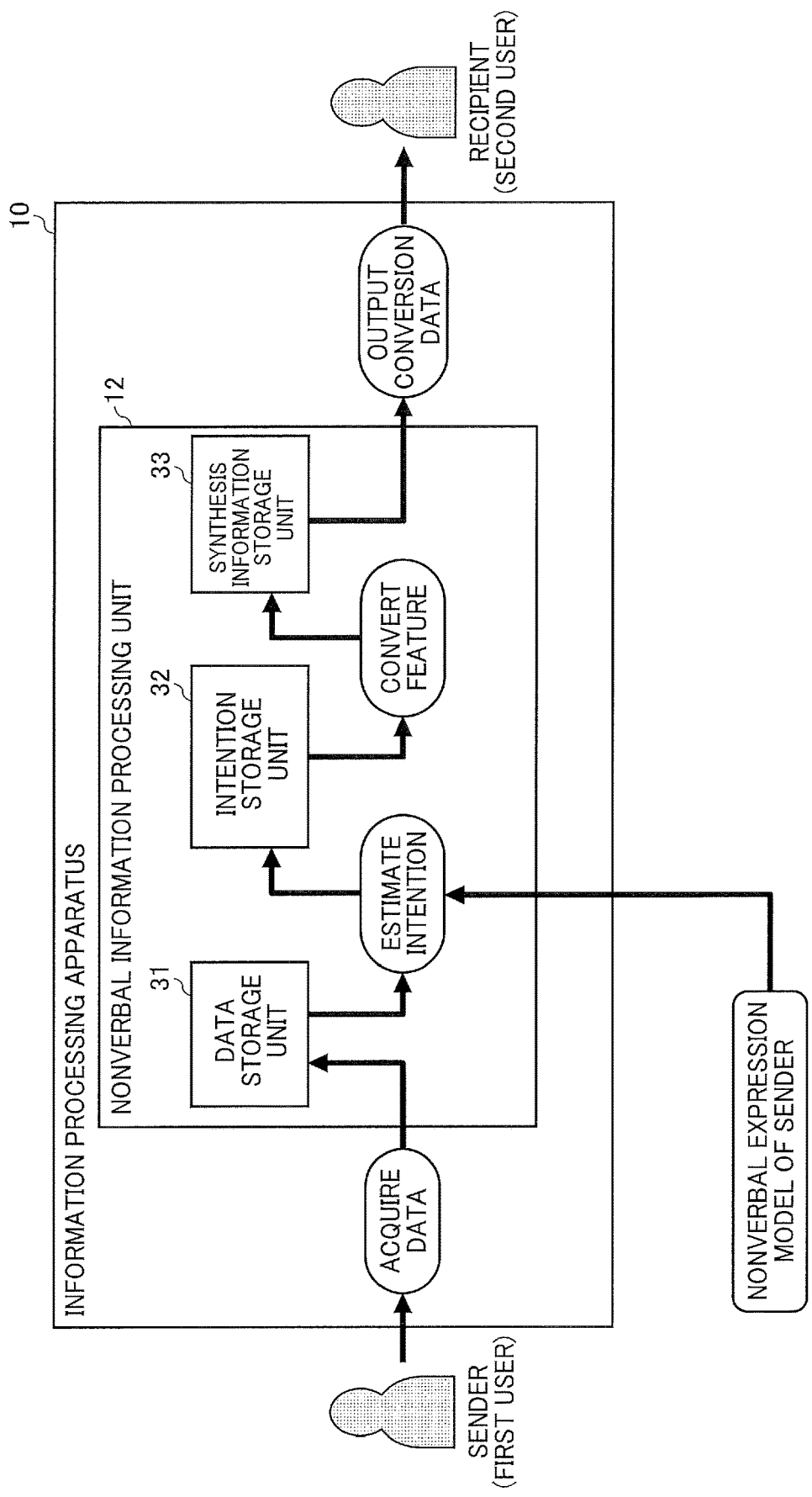

FIG. 13A

| FN | AU1 | AU2 | AU4 | SPINE LANDMARK 1 | SPINE LANDMARK 2 | LINE-OF-SIGHT DIRECTION (RIGHT EYE) | LINE-OF-SIGHT DIRECTION (LEFT EYE) |
|---|---|---|---|---|---|---|---|
| (1) | (2) | (3) | (4) | (5) | (6) | (7) | |
| 1 | 0.3 | 0.2 | 0.6 | 0.5 | −0.6 | 0.2 | 0.1 |

FIG. 13B

| FN | AU1 | AU2 | AU4 | SPINE LANDMARK 1 | SPINE LANDMARK 2 | LINE-OF-SIGHT DIRECTION (RIGHT EYE) | LINE-OF-SIGHT DIRECTION (LEFT EYE) |
|---|---|---|---|---|---|---|---|
| (1) | (2) | (3) | (4) | (5) | (6) | (7) | |
| 1 | 0.3 | 0.2 | 0.6 | 0.25 | −0.3 | 0.1 | 0.05 |

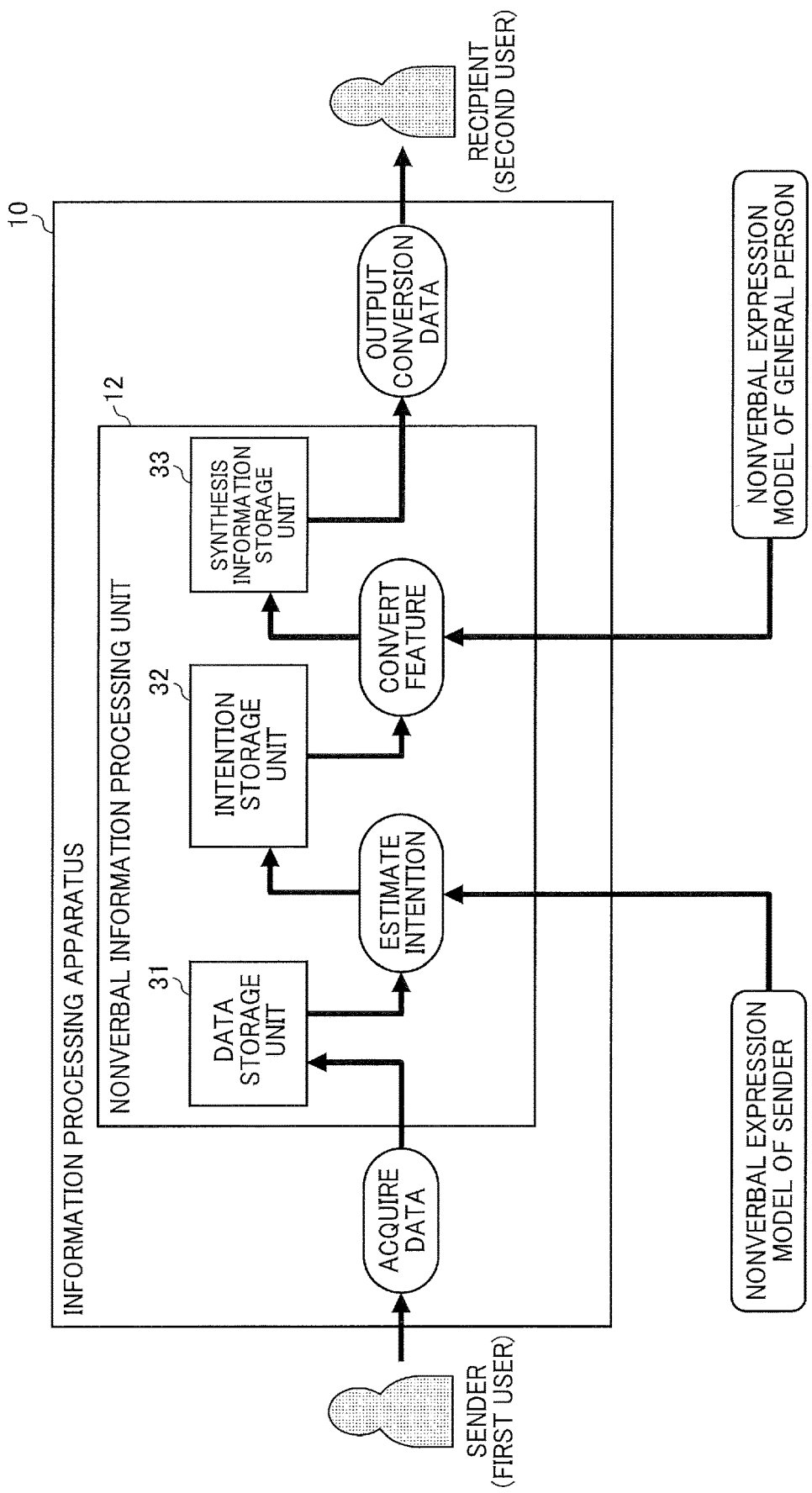

INFORMATION PROCESSING APPARATUS, NONVERBAL INFORMATION CONVERSION SYSTEM, AND INFORMATION PROCESSING METHOD

CROSS-REFERENCE TO RELATED APPLICATION

This patent application is based on and claims priority pursuant to 35 U.S.C. § 119(a) to Japanese Patent Application No. 2021-044286, filed on Mar. 18, 2021, in the Japan Patent Office, the entire disclosure of which is hereby incorporated by reference herein.

BACKGROUND

Technical Field

The present disclosure relates to an information processing apparatus, a nonverbal information conversion system, and an information processing method.

Related Art

In recent years, the development of deep learning enables accurate recognition of nonverbal information such as a person's line of sight and facial expression from a video image in real time. This technology is applied to various applications such as automatic analysis of surveillance camera images and health condition monitoring. Further, in recent years, a nonverbal information conversion technology developed in conjunction with the nonverbal information recognition technology is attracting attention. These techniques enable to give a desired impression to a partner in a conversation using a video call, for example.

To express and recognize nonverbal information has some significance in dialogue communication. On the other hand, issues may occur in dialogue due to the inability to handle nonverbal information correctly or the misinterpretation of nonverbal information from one to another. To address such issues, for example, a technique is known that estimates emotion from voice, generates character image that helps a conversation partner to recognize the emotion, and displays the generated character image.

SUMMARY

An embodiment of the present disclosure includes an information processing apparatus including circuitry. The circuitry estimates an intention indicated in first nonverbal information, which is nonverbal information of a first user, based on a feature amount of the first nonverbal information and a nonverbal expression model indicating a relation between the first nonverbal information and an intention. The circuitry converts the first nonverbal information into second nonverbal information to be output to a second user based on the estimated intention and a set conversion rule of the nonverbal information.

Another embodiment of the present disclosure includes a nonverbal information conversion system including circuitry. The circuitry estimates an intention indicated in first nonverbal information, which is nonverbal information of a first user, based on a feature amount of the first nonverbal information and a nonverbal expression model indicating a relation between the first nonverbal information and an intention. The circuitry converts the first nonverbal information into second nonverbal information to be output to a second user based on the estimated intention and a set conversion rule of the nonverbal information.

Another embodiment of the present disclosure includes an information processing method performed by an information processing apparatus. The information processing method includes estimating an intention indicated in first nonverbal information, which is nonverbal information of a first user, based on a feature amount of the first nonverbal information and a nonverbal expression model indicating a relation between the first nonverbal information and an intention. The information processing method includes converting the first nonverbal information into second nonverbal information to be output to a second user based on the estimated intention and a set conversion rule of the nonverbal information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a conceptual diagram illustrating an example of an intention-feature database corresponding to a nonverbal expression model, according to an embodiment of the present disclosure;

FIG. 10A is a table indicating an example of parameters of feature amounts of nonverbal information to be input, according to an embodiment of the present disclosure;

FIG. 10B is a table indicating an example of parameters of feature amounts of nonverbal information obtained by conversion, according to an embodiment of the present disclosure;

FIG. 12 is a schematic diagram illustrating an example of a nonverbal information conversion system, according to the second embodiment;

FIG. 13A is a table indicating an example of a parameter of a feature amount of nonverbal information to be input, according to an embodiment of the present disclosure;

FIG. 13B is a table indicating an example of a parameter of a feature amount of nonverbal information obtained by conversion, according to an embodiment of the present disclosure;

FIG. 14 is a schematic diagram illustrating an example of a nonverbal information conversion system, according to the third embodiment;

Figure 1:
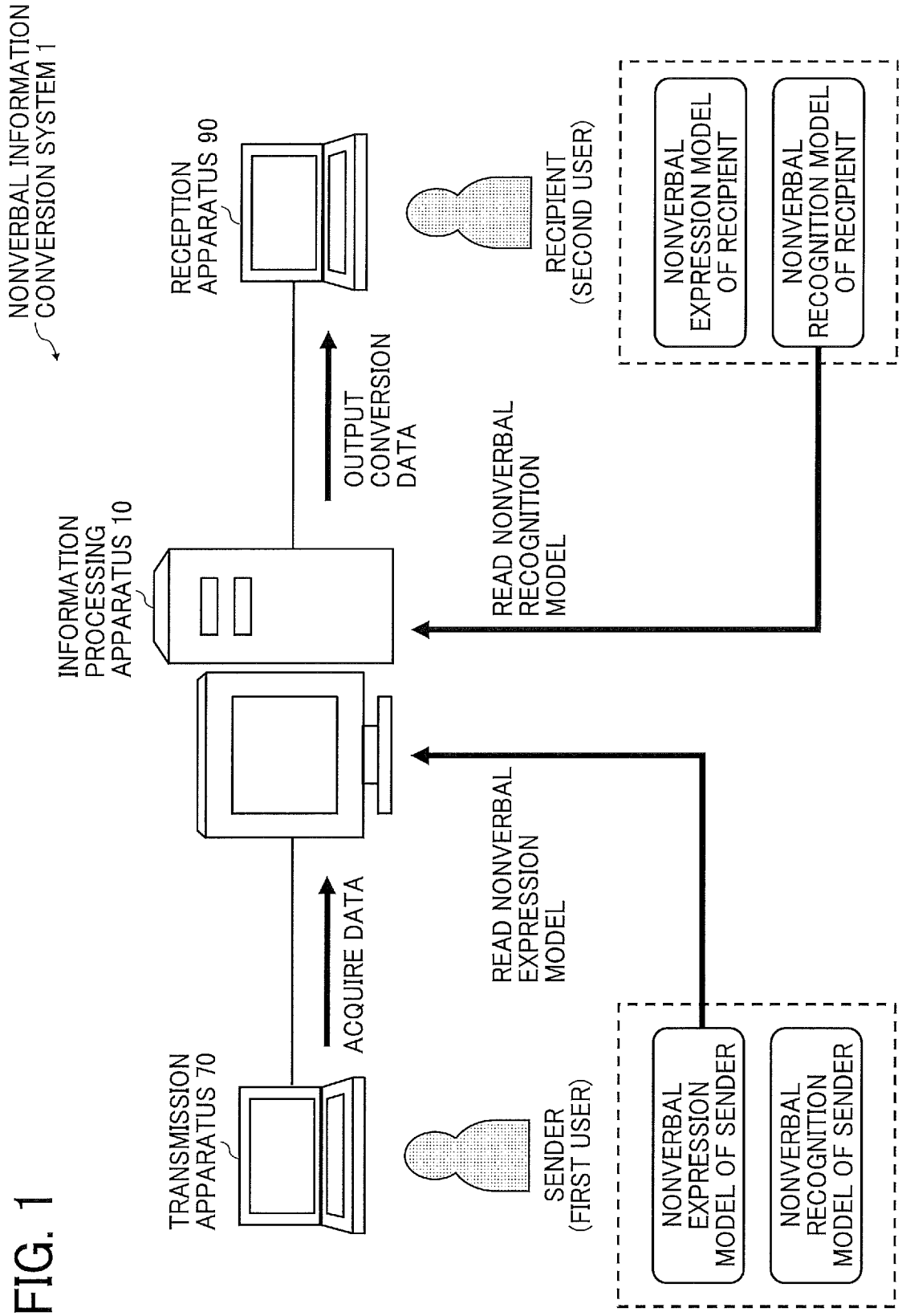
FIG. 1 is a schematic diagram illustrating an example of an overall configuration of a nonverbal information conversion system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described with reference to the drawings. In the description of the drawings, the same elements are denoted by the same reference numerals, and redundant descriptions thereof are omitted.

Embodiment

Overview of Nonverbal Information Conversion System

Referring to FIG. 1, an overview of a nonverbal information conversion system 1 is described according to an embodiment. FIG. 1 is a schematic diagram illustrating an example of an overall configuration of the nonverbal information conversion system 1. The nonverbal information conversion system 1 illustrated in FIG. 1 is a system that converts nonverbal information exchanged in dialogue communication using video communication, for example.

As illustrated in FIG. 1, the nonverbal information conversion system 1 includes an information processing apparatus 10 that converts nonverbal information, a transmission apparatus 70 used by a sender of the nonverbal information, and a reception apparatus 90 used by a recipient of the nonverbal information. The information processing apparatus 10, the transmission apparatus 70, and the reception apparatus 90 included in the nonverbal information conversion system 1 are communicable with each other through a communication network. The communication network includes the Internet, a mobile communication network, and a local area network (LAN), for example. In another example, the communication network includes a network by not only wired communications but also a network by wireless communications such as 3rd generation (3G), 4th generation (4G), 5th generation (5G), Wireless Fidelity® (Wi-Fi), Worldwide Interoperability for Microwave Access (WiMAX) or Long Term Evolution (LTE).

The information processing apparatus 10 is a computer that converts nonverbal information so that an intention of a first user, who is the sender, is intelligibly transmitted to a second user, who is the recipient. The information processing apparatus 10 acquires data including nonverbal information of the sender, converts the nonverbal information so that an intention of the sender is intelligibly communicated to the recipient, and outputs conversion data obtained by converting the nonverbal information to the acquired data.

In the disclosure, the nonverbal information includes a feature amount such as a user's line of sight, a user's facial expression, a posture of a user's upper limb, a shape of a user's hand, a shape or a posture of a user's arm or foot, or a tone or intonation of user's voice. The intention of the sender includes one or more of a condition of the sender (e.g., pleasant, concentrated, or active), an emotion of the sender (e.g., happy, angry, sad, pleasure, composed, or disgusted), and will of the sender (e.g., instruct, deny, or request) that the sender desires to communicate to the recipient.

The nonverbal information conversion system 1 further includes a nonverbal expression model and a nonverbal recognition model constructed for each user in order to improve the conversion accuracy of the nonverbal information. The nonverbal expression model stores a relation between a user's nonverbal expression and an intention. The nonverbal expression model is a model that learns individuality in the nonverbal expression of the user. The nonverbal recognition model stores a relation between a user's nonverbal recognition and an expression. The nonverbal recognition model is a model for learns individuality in nonverbal recognition of the user.

The nonverbal information conversion system 1 uses the nonverbal expression model and the nonverbal recognition model learned for each user to convert the nonverbal information, thereby converting the nonverbal information in consideration of individuality in expression and recognition of the nonverbal information. For example, as illustrated in FIG. 1, the information processing apparatus 10 reads the nonverbal expression model of the sender and the nonverbal recognition model of the recipient, to convert the acquired data including the nonverbal information of the sender into nonverbal information that is easy for the recipient to recognize.

In one example, the information processing apparatus 10 is implemented by a single computer. In another example, the information processing apparatus 10 is implemented by a plurality of computers. In one example, the information processing apparatus 10 is implemented by a computer residing in a cloud environment. In another example, the information processing apparatus 10 is implemented by a computer existing residing in an on-premises environment.

The transmission apparatus 70 is a computer such as a laptop computer used by the sender in dialogue communication. The reception apparatus 90 is a computer such as a laptop computer used by the recipient in dialog communication. The transmission apparatus 70 transmits, to the information processing apparatus 10, video data obtained by capturing the sender from the front, for example. The reception apparatus 90 controls a display to display video in which the sender appears, based on video data (conversion data) converted by the information processing apparatus 10. The laptop computer is merely one example of each of the transmission apparatus 70 and the reception apparatus 90. In another example, each of the transmission apparatus 70 and the reception apparatus 90 is implemented by a smartphone, a tablet terminal, a wearable terminal, or desktop personal computer (PC). Although FIG. 1 illustrates an example of dialogue communication is performed between two persons, the nonverbal information conversion system 1 is also applicable to dialogue communication between three or more persons. In still another example in dialogue communication, each of the sender and the recipient serves as both the sender and the recipient.

In conversion of nonverbal information in dialogue communication, a technology is known that converts facial expression of a user photographed by a camera or an attribute of the user such as sex or age in real time, or adjusts intonation and tone of machine voice in order to change an impression given to the other party of the dialogue communication. The nonverbal information has a stronger influence on the impression than verbal information. Accordingly, it is considered that a desired impression is given to the other party by using of the technology as described above.

Further, in dialogue communication, expressing and recognizing nonverbal information correctly has some significance. Issues sometimes occur in dialogue due to a case in which nonverbal information is not correctly handled or a difference in interpretation of nonverbal information between the sender and recipient of the nonverbal information. In particular, in the field of nursing care or nursing education, trouble is likely to occur between a person who is not able to handle nonverbal information well and a staff member. In such a situation, there is often a discrepancy between an intention to be communicated and nonverbal expression, or there is often a difference between nonverbal expression and a recognition rule between such the person who is not able to handle nonverbal information well and the staff member, for example. In such a situation, for example, a technology is known that, in response to an input of voice by a sender who does not master sign language expression, syntheses a sign language image that is easy to understand to a recipient. Further, a technology is known that converts visual information into easy-to-recognize information for a visually impaired person or a person with low vision.

However, there are differences in recognition and expression of nonverbal information between individuals and between cultures. To address such an issue, estimation and expression are to be performed according to individuals. According to the conventional method as described above, there is room for improvement in converting nonverbal information in consideration of individuality in expression and recognition of nonverbal information.

To address such an issue, in the nonverbal information conversion system 1, the information processing apparatus 10 estimates an intention of the sender based on the nonverbal expression model of the sender by using video data indicating nonverbal information of the sender as an input. Further, the information processing apparatus 10 converts the nonverbal information of the sender based on the estimated intention and a set conversion rule (e.g., a conversion rule based on the nonverbal recognition model of the recipient). Furthermore, the information processing apparatus 10 outputs video data, which is the conversion data, indicating the converted nonverbal information, to the recipient. With this configuration, the nonverbal information conversion system 1 intelligibly communicate the intention of the sender to the recipient in the dialogue between the sender and the recipient.

Hardware Configuration

Figure 2:
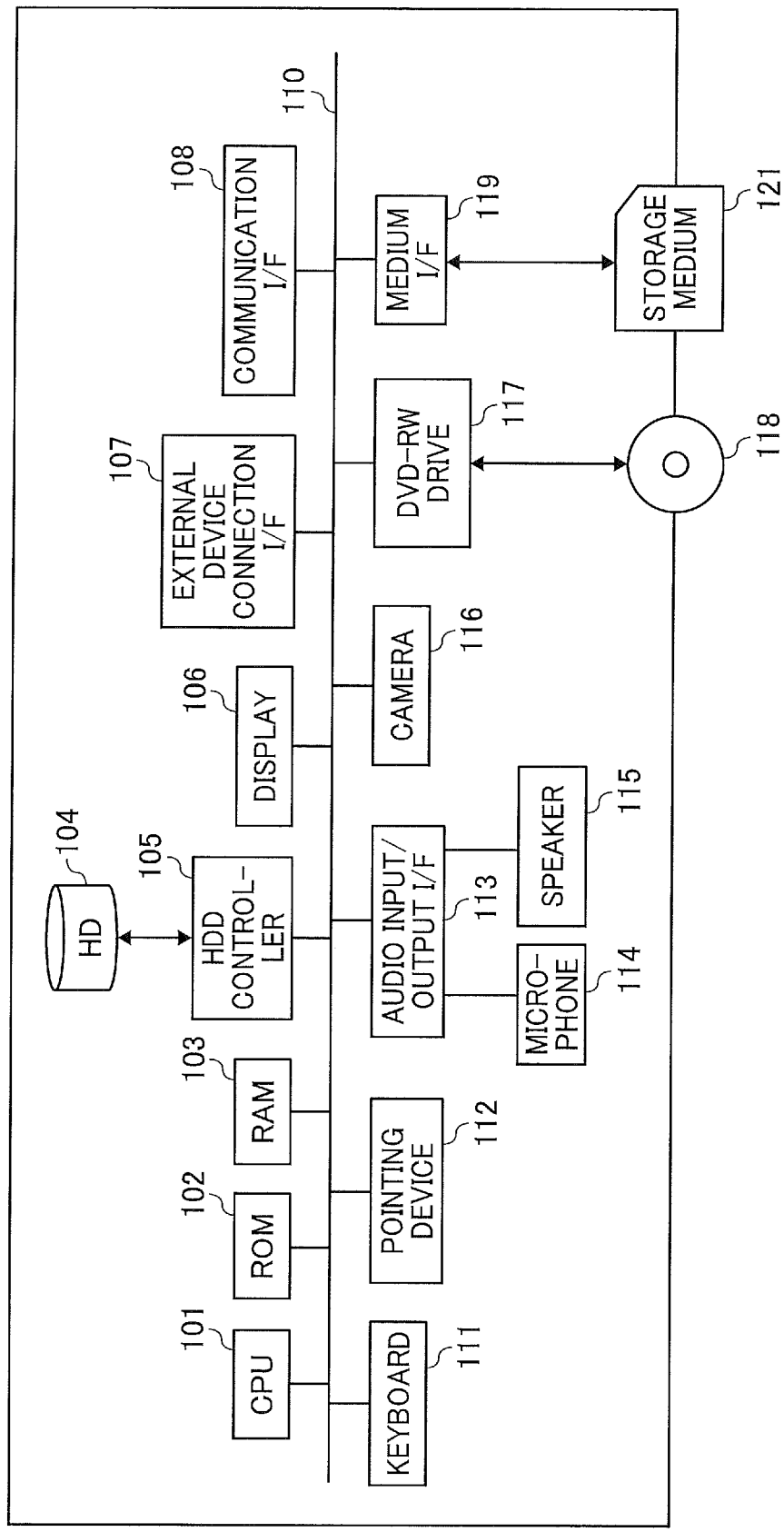
FIG. 2 is a block diagram illustrating an example of a hardware configuration of a computer, according to an embodiment of the present disclosure.

Referring to FIG. 2, an example of a hardware configuration of each of the apparatuses of the nonverbal information conversion system 1 is described, according to an embodiment. The apparatuses of the nonverbal information conversion system 1 have a configuration of a general-purpose computer. An example of a hardware configuration of the general-purpose computer is described.

FIG. 2 is a block diagram illustrating an example of a hardware configuration of a computer. In one example, the computer in the present embodiment and embodiment described below have the same configuration as illustrated in FIG. 2. In another example, one or more components or elements are added or deleted as needed. The computer includes a central processing unit (CPU) 101, a read only memory (ROM) 102, a random access memory (RAM) 103, a hard disk (HD) 104, a hard disk drive (HDD) controller 105, a display 106, an external device connection interface (I/F) 107, a communication I/F 108, a bus line 110, a keyboard 111, a pointing device 112, an audio input/output I/F 113, a microphone 114, a speaker 115, a camera 116, a digital versatile disk rewritable (DVD-RW) drive 117 and a medium I/F 119.

The CPU 101 controls overall operation of the computer. The ROM 102 stores a program such as an initial program loader (IPL) to boot the CPU 101. The RAM 103 is used as a work area for the CPU 101. The HD 104 stores various data such as a program. The HDD controller 105 controls reading or writing of various data from or to the HD 104 under control of the CPU 101. The display 106 is an example of a display device (display means) that displays various types of information such as a cursor, a menu, a window, characters, or an image. In one example, the display 106 is a touch panel display provided with an input device (input means). The external device connection I/F 107 is an interface that connects the computer to various extraneous sources. The communication I/F 108 is an interface for data transmission and reception with other computers or electronic devices. The communication I/F 108 is, for example, a communication interface such as a wired or wireless LAN. In another example, the communication I/F 108 includes a communication interface for mobile communication such as 3G, 4G, 5G, or LTE, Wi-Fi®, or WiMAX. The bus line 110 is, for example, an address bus or a data bus, which electrically connects the elements such as the CPU 101 illustrated in FIG. 2.

The keyboard 111 is an example of an input device (input means) including a plurality of keys for inputting characters, numerical values, various instructions, and the like. The pointing device 112 is an example of an input device (input means) that allows a user to select or execute a specific instruction, select an object for processing, or move a cursor being displayed. The keyboard 111 and the pointing device 112 are merely examples of the input device (input means). In another example, a touch panel, a voice input device, or the like is used as the input device (input means). In still another example, instead of or in alternative to the display device (display means) such as the display 106 and the input device (input means) such as the keyboard 111 and the pointing device 112, a user interface (UI) external to the computer is used. The audio input/output I/F 113 is a circuit for inputting or outputting an audio signal between the microphone 114 and the speaker 115 under control of the CPU 101. The microphone 114 is an example of an audio collecting device (audio collecting means), which is a built-in type, that receives an input of audio. The speaker 115 is an example of an output device (output means), which is a built-in type, that outputs an audio signal. The camera 116 is an example of an image capturing device (image capturing means), which is a built-in type, that captures an image of an object to obtain image data. In another example, each of the microphone 114, the speaker 115, and the camera 116 is an external device in alternative to the built-in device of the computer. The DVD-RW drive 117 controls reading or writing of various data to or from a DVD-RW 118, which is an example of a removable storage medium. In another example, the removable storage medium includes at least one of digital versatile disk-recordable (DVD-R) or a Blu-ray® disc, in addition to or in alternative to the DVD-RW. The medium I/F 119 controls reading or writing (storing) of data from or to a storage medium 121 such as a flash memory.

For example, any one of the above-described control programs is recorded in a file in a format installable or executable on a computer-readable storage medium for distribution. Examples of the storage medium include, but are not limited to, a compact disc-recordable (CD-R), a digital versatile disk (DVD), a Blu-ray® disc, a secure digital (SD) card, and a universal serial bus (USB) memory. In addition, such storage medium may be provided in the form of a program product to users within a certain country or outside that country. For example, the information processing apparatus 10 implements an information processing method according to the present disclosure by executing a program according to the present disclosure.

Functional Configuration

Figure 3:
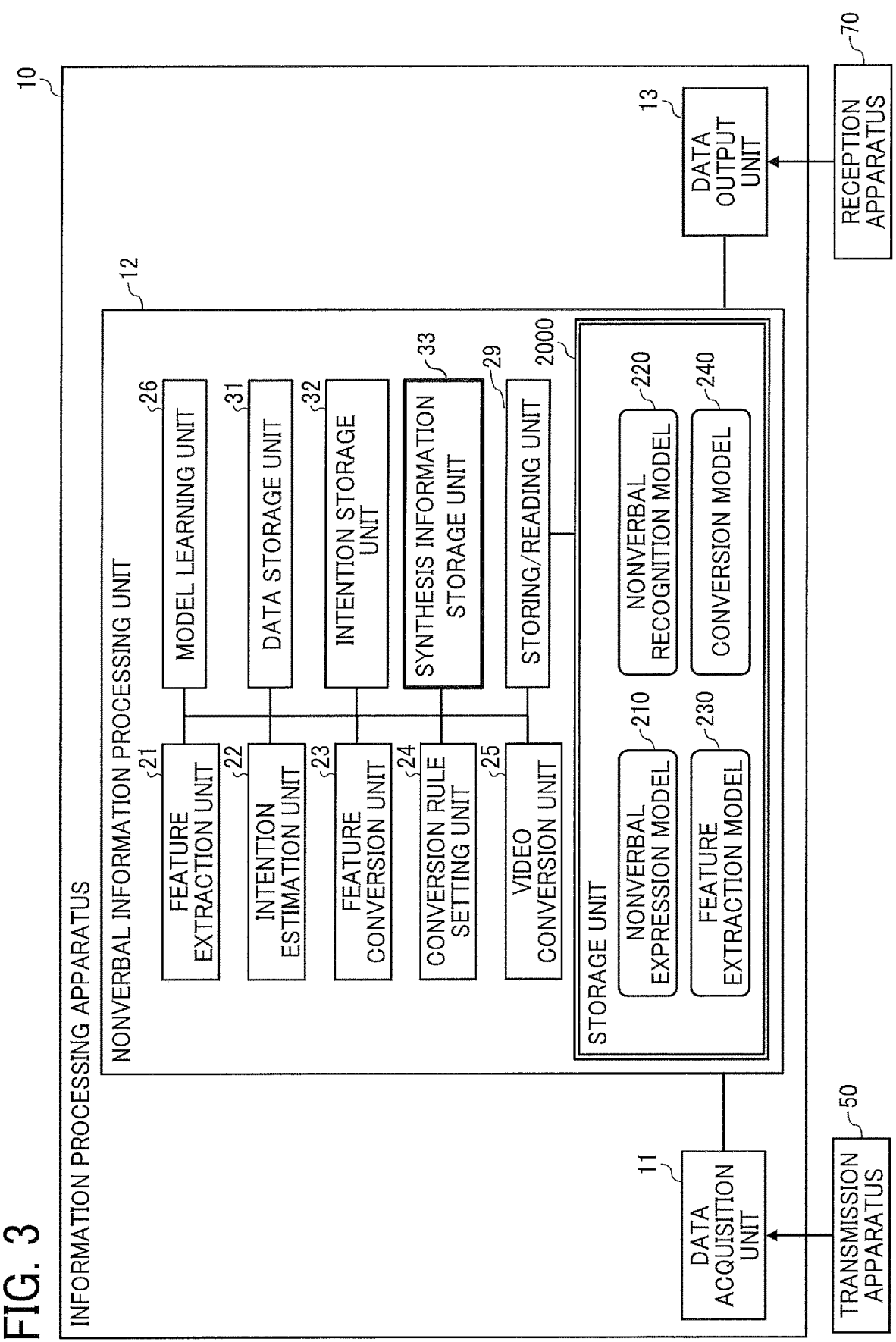
FIG. 3 is a block diagram illustrating an example of a functional configuration of an information processing apparatus, according to an embodiment of the present disclosure.

Referring to FIG. 3, a functional configuration of the nonverbal information conversion system 1 is described according to an embodiment. FIG. 3 is a block diagram illustrating an example of a functional configuration of the information processing apparatus 10. The information processing apparatus 10 includes a data acquisition unit 11, a nonverbal information processing unit 12, and a data output unit 13. These units are functions or means implemented by or that are caused to function by operating any of the hardware elements illustrated in FIG. 2 in cooperation with instructions of the CPU 101 according to the program for the information processing apparatus expanded to the RAM 103.

The data acquisition unit 11 is implemented mainly by the communication I/F 108 or the external device connection I/F 107 operating under control of the CPU 101. The data acquisition unit 11 acquires various data transmitted from the transmission apparatus 70.

The nonverbal information processing unit 12, which is implemented mainly by instructions of the CPU 101, converts nonverbal information indicated by data acquired by the data acquisition unit 11.

The data output unit 13 is implemented mainly by the communication I/F 108 or the external device connection I/F 107 operating under control of the CPU 101. The data output unit 13 outputs various data obtained by processing by the nonverbal information processing unit 12 to the reception apparatus 90.

A detailed description is now given of a configuration of the nonverbal information processing unit 12. The nonverbal information processing unit 12 includes a feature extraction unit 21, an intention estimation unit 22, a feature conversion unit 23, a conversion rule setting unit 24, a video conversion unit 25, a model learning unit 26, a data storage unit 31, an intention storage unit 32, a synthesis information storage unit 33, and a storing/reading unit 29. The nonverbal information processing unit 12 further includes a storage unit 2000, which is implemented by the ROM 102, the HD 104, or the storage medium 121 illustrated in FIG. 2.

The feature extraction unit 21 uses video of a certain person as an input, to extract a feature amount of nonverbal information indicated in the video.

The intention estimation unit 22 estimates an intention of the sender based on the nonverbal information of the sender indicated in the data acquired by the data acquisition unit 11 and the nonverbal expression model of the sender.

Based on the intention estimated by the intention estimation unit 22 and a conversion rule set by the conversion rule setting unit 24, the feature conversion unit 23 converts the feature amount of the nonverbal information of the sender indicated in the data acquired by the data acquisition unit 11.

The conversion rule setting unit 24 sets the conversion rule for converting the feature amount of the nonverbal information of the sender.

The video conversion unit 25 converts the video data acquired by the data acquisition unit 11 based on the feature amount converted by the feature conversion unit 23.

The model learning unit 26 learns various learning models (a nonverbal expression model 210, a nonverbal recognition model 220, a feature extraction model 230, and a conversion model 240) used for conversion of nonverbal information.

The data storage unit 31 stores various data used for conversion of nonverbal information. The intention storage unit 32 stores the intention of the sender estimated by the intention estimation unit 22. The synthesis information storage unit 33 stores synthesis information corresponding to the video of the sender, which is the conversion data obtained by the conversion by the video conversion unit 25.

The storing/reading unit 29 stores various data (or information) in the storage unit 2000 and/or reads various data (or information) from the storage unit 2000. The storage unit 2000 stores the nonverbal expression model 210, the nonverbal recognition model 220, the feature extraction model 230, and the conversion model 240, which are constructed by conversion processing on the nonverbal information and learned by the model learning unit 26. The nonverbal expression model 210 and the nonverbal recognition model 220 depend on the person, and thus different models are stored for respective users. In one example, model parameters of the nonverbal expression model 210 and the nonverbal recognition model 220 are adjusted to perform desired recognition of the nonverbal expression and conversion of nonverbal recognition, based on parameters of the extracted feature amount, for example. In another example, the model parameters of the nonverbal expression model 210 and the nonverbal recognition model 220 are adjusted according to the relation between the sender and the recipient based on the parameters of the extracted feature amount. On the other hand, the feature extraction model 230 and the conversion model 240 do not depend on the person, and thus one model is stored for each model. In another example, the storage unit 2000 in which the learning models are stored is provided in one or more storage devices that are external to the information processing apparatus 10.

First Embodiment

Overview

Figure 4:
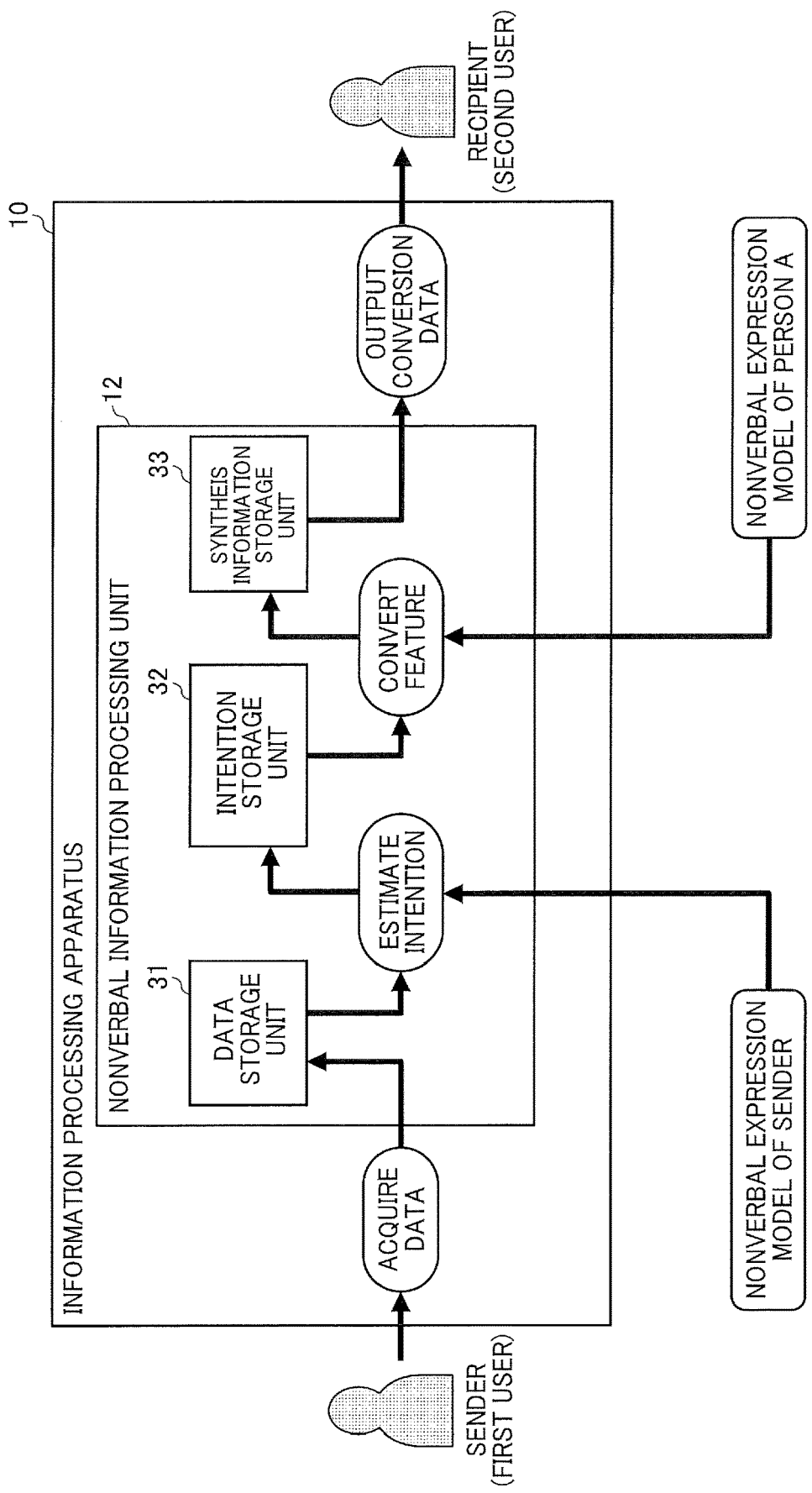
FIG. 4 is a schematic diagram illustrating an example of a nonverbal information conversion system, according to the first embodiment.

Referring to FIG. 4 to FIG. 11, the nonverbal information conversion system 1A is described according to the first embodiment. FIG. 4 is a schematic diagram illustrating an example of the nonverbal information conversion system 1A according to the first embodiment. The nonverbal information conversion system 1A according to the first embodiment is a system that converts nonverbal information using a nonverbal expression model of a sender and a nonverbal expression model of a person A in dialogue communication between the sender and a recipient. The person A is a person who is different from the sender and the recipient and who practices behavior that gives a better impression than the sender. The person A is an example of a third user.

First, the information processing apparatus 10 acquires video data in which the sender appears and stores the video data in the data storage unit 31 of the nonverbal information processing unit 12. Next, the nonverbal information processing unit 12 reads the nonverbal expression model of the sender, and estimates the intention of the sender from the video data of the sender stored in the data storage unit 31 using the read nonverbal expression model of the sender. Then, the nonverbal information processing unit 12 stores information indicating the estimated intention of the sender in the intention storage unit 32.

Next, the nonverbal information processing unit 12 reads the nonverbal expression model of the person A, and converts the feature amount of the nonverbal information indicated in the video data of the sender from the intention of the sender stored in the intention storage unit 32 using the read nonverbal expression model of the person A. Further, the nonverbal information processing unit 12 converts the video data of the sender based on the converted feature amount, to generate conversion data, which is synthesis information in which the video and label information are combined. The nonverbal information processing unit 12 stores the synthesis information, which is the conversion data, in the synthesis information storage unit 33. Then, the information processing apparatus 10 outputs, to the recipient, the converted nonverbal information indicated by the synthesis information stored in the synthesis information storage unit 33 of the nonverbal information processing unit 12.

As described, in dialogue communication between the sender and the recipient, the nonverbal information conversion system 1A according to the first embodiment converts nonverbal information using the nonverbal expression model of the person A, who expresses nonverbal information in easy-to-understand manner, in addition to the nonverbal expression model of the sender. This configuration improves the conversion accuracy of the nonverbal information.

Processes or Operations of the First Embodiment

Figure 5:
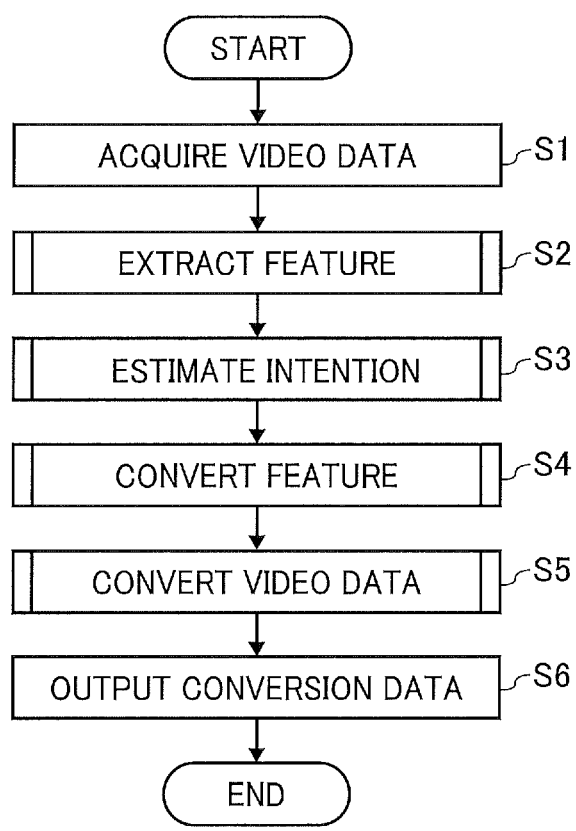
FIG. 5 is a flowchart illustrating an example of a nonverbal information conversion process, according to an embodiment of the present disclosure.

Referring to FIG. 5 to FIG. 11, processes or operation performed by the nonverbal information conversion system 1A is described according to the first embodiment. First, referring to FIG. 5, an overall flow of a nonverbal information conversion process performed by the nonverbal information conversion system 1A is described. FIG. 5 is a flowchart illustrating an example of the nonverbal information conversion process.

First, the data acquisition unit 11 of the information processing apparatus 10 acquires video data in which the sender appears, who is an example of a first user (step S1). Specifically, the transmission apparatus 70 used by the sender captures the sender using the camera 116, and transmits the captured video data to the information processing apparatus 10. Then, the data acquisition unit 11 of the information processing apparatus 10 acquires the video data transmitted from the transmission apparatus 70. The video of the sender includes mainly, for example, video obtained by capturing actions performed by the sender in daily communication. The data acquisition unit 11 stores the acquired video data in the data storage unit 31 of the nonverbal information processing unit 12.

Next, the nonverbal information processing unit 12 of the information processing apparatus 10 inputs the video data acquired in step S1 to the feature extraction model 230, to extract a feature amount of the nonverbal information (step S2). The feature amount of the nonverbal information includes a parameter such as positions of facial landmarks of a person, an action unit (AU), line-of-sight angles of both eyes, positions of skeleton landmarks, a head a rotation angle, or a distance.

Next, the nonverbal information processing unit 12 of the information processing apparatus 10 inputs the feature amount extracted in step S2 to the nonverbal expression model 210 to estimate the intention of the sender. For example, the nonverbal information processing unit 12 acquires intention label information indicating the intention of the sender using the nonverbal expression model 210 into which the extracted feature amount is input. The intention label information includes information in which the intensities of the basic six emotions "happy, angry, sad, surprised, disgusted, and composed" and "Neutral, Deny, Accept, Arousal, and Interested" are represented by the value from 0 to 1.

Next, the nonverbal information processing unit 12 of the information processing apparatus 10 inputs the intention estimated in step S3 to the conversion rule set by the conversion rule setting unit 24 to convert the feature amount, thereby acquiring desired feature amount (step S4).

Next, the nonverbal information processing unit 12 of the information processing apparatus 10 inputs the feature amount converted in step S4 to the conversion model 240, to convert the video data acquired in step S1, thereby acquiring the converted video as the conversion data (step S5).

Then, the data output unit 13 of the information processing apparatus 10 outputs the converted video converted in step S5, which is the conversion data, to the recipient, who is an example of a second user (step S6). Specifically, the data output unit 13 transmits the converted video to the reception apparatus 90 used by the recipient. The reception apparatus 90 displays the converted video transmitted (output) from the information processing apparatus 10 on the display 106.

Feature Amount Extraction Process

Figure 6:
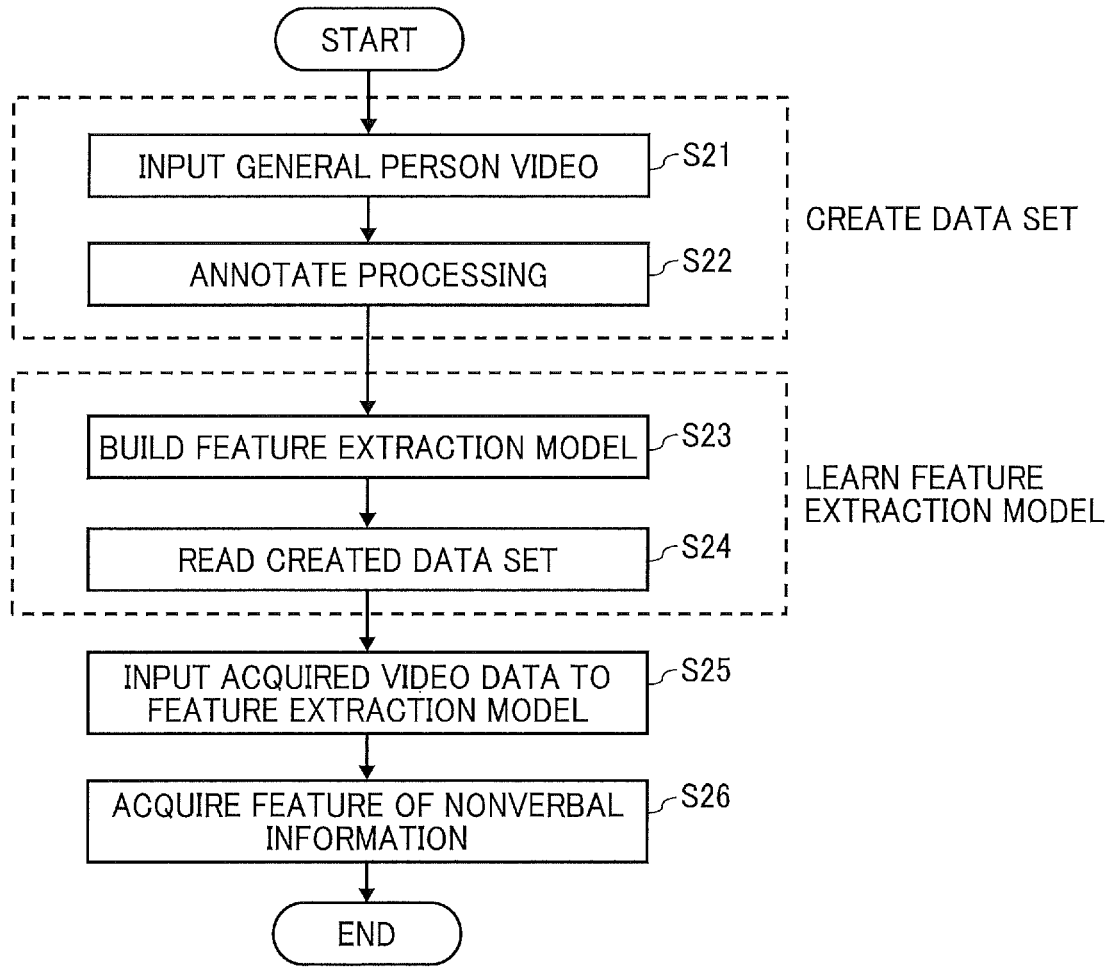
FIG. 6 is a flowchart illustrating an example of a process of extracting a feature amount of nonverbal information, according to an embodiment of the present disclosure.

A detailed description is now given of each of the processes illustrated in FIG. 5 with reference to FIG. 6 to FIG. 11. First, referring to FIG. 6, the process of extracting a feature amount performed by the nonverbal information processing unit 12 of the information processing apparatus 10 in step S2 is described. FIG. 6 is a flowchart illustrating an example of a process of extracting a feature amount of nonverbal information.

First, the feature extraction unit 21 inputs a general person video, which is video obtained by capturing a person who is different from the sender and the person A (step S21). The general person video is video obtained by capturing a third party person (general person), who is different from the sender, the person A, and the recipient. Further, the general person video is video obtained by capturing a motion in which the general person variously changes a facial expression, a body or head direction, a line-of-sight direction, and a distance from the camera, for example. Next, the feature extraction unit 21 performs an annotation processing using the general person video input in step S21 (step S22). The feature extraction unit 21 defines a feature amount of the nonverbal information as label information by, for example, an input operation to the keyboard 111 by an annotator. Thus, the feature extraction unit 21 creates a data set used for the feature amount extraction process. The feature extraction unit 21 stores the created data set in the data storage unit 31.

Next, the feature extraction unit 21 builds the feature extraction model 230 used for feature amount extraction (step S23). The feature extraction model 230 includes layers of an input layer, a convolutional neural network (CNN) layer, a long short-term memory (LSTM) layer, and an estimation layer. In the feature extraction model 230, a feature amount of an image of each of frames of the input video is extracted by the CNN layer. Further, in the feature extraction model 230, a feature amount and state information of the nonverbal information in each of the frames are extracted by the LSTM layer with the feature amount of a plurality of frame images in the input video as an input. The state information in each of the frames corresponds to memory information to be transmitted to the next cell in processing in the LSTM, and represents context information in the LSTM that performs text analysis. The state information represents a state of a person such as being still or in motion. By combining the CNN layer and the LSTM layer, the feature extraction model 230 concurrently performs an analysis of each frame image and an analysis of time-series information.

Next, the feature extraction unit 21 reads the data set created by the processes of step S21 and step S22 to learn the feature extraction model 230 (step S24). Thus, the model learning unit 26 learns the feature extraction model 230 used for extracting the feature amount. Since the extraction of the feature amount of the nonverbal information from the input video does not change depending on the person, it is enough that the learning of the feature extraction model 230 is performed once. In another example, in a case that the feature extraction model 230 that has already been learned is present, the processes of step S23 and step S24 are omitted.

Next, the feature extraction unit 21 inputs the video data acquired in step S1 to the feature extraction model 230 learned in the processes of step S23 and step S24 (step S25). Then, the feature extraction unit 21 acquires a feature amount of the nonverbal information indicated by the video data acquired in step S1 (step S26).

In another example, the above-described processes of step S21 to step S25 are omitted by using a known technology capable of acquiring a feature amount in real time, such as OpenFace described in Tabas Baltrusaitis, et al., "OpenFace: an open source facial behavior analysis toolkit", ICCV 2016.

Intention Estimation Process

Figure 7:
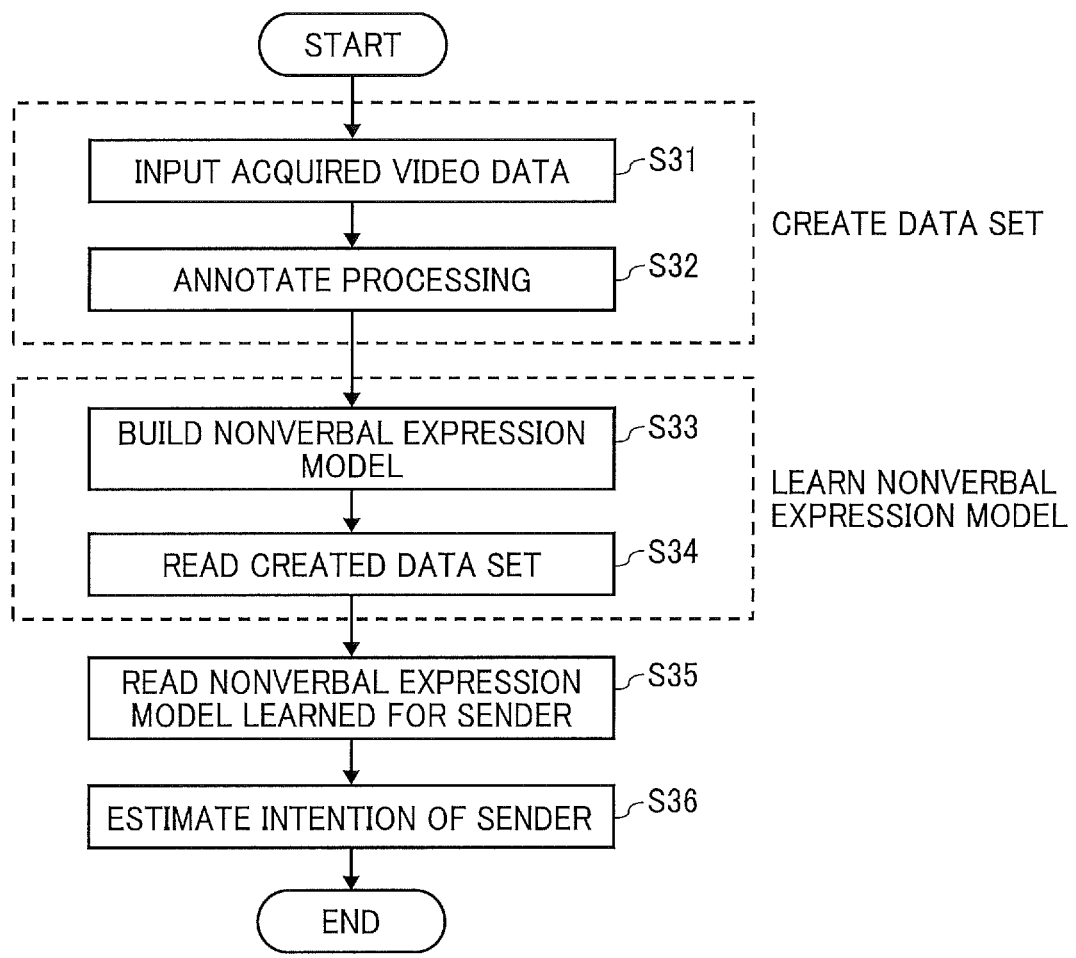
FIG. 7 is a flowchart illustrating an example of a process of estimating an intention of a sender, according to an embodiment of the present disclosure.

Next, referring to FIG. 7 and FIG. 8, the process of estimating an intention performed by the nonverbal information processing unit 12 of the information processing apparatus 10 in step S3 is described. FIG. 7 is a flowchart illustrating an example of a process of estimating an intention of the sender.

First, the intention estimation unit 22 inputs the video data of the sender acquired in step S1 (step S31). Then, the intention estimation unit 22 performs an annotation processing using the video data input in step S21 (step S32). The intention estimation unit 22 defines an intention corresponding to the video of the sender as the intention label information by, for example, an input operation to the keyboard 111 by an annotator. Equation 1 is an example of the intention label information L.

Intention label information L={angry; 0.1, composed; 0.2, disgusted; 0.2, happy; 0.8, sad; 0.4, surprised; 0.6, neutral; 0.2, deny; 0.3, accept; 0.3, arousal; 0.7, interested; 0.81}     Equation 1

Further, the annotate in step S32 is assumed to be performed by the sender himself/herself (annotator=sender) and defines the type and intensity of the intention as indicated in Equation 1, for example. The annotator reproduces, for example, the video data input in step S31 and inputs a numerical value of the intensity of the intention in each frame of the video. In the annotation processing, for example, a dedicated application is used to allow the annotator to specify the numerical value of the intensity of the intention in each frame by a drag operation using an input device such as the pointing device 112, thereby reducing workload of the annotation processing. In another example, the annotation is performed by specifying various types or multidimensional information such as the type or certainty factor of the intention in addition to specifying the numerical value of the strength of the intention by the drag operation or the like using the input device such as the pointing device 112. Thus, the intention estimation unit 22 creates a data set used for the intention estimation process. The intention estimation unit 22 stores the created data set in the data storage unit 31.

Next, the intention estimation unit 22 builds the nonverbal expression model 210 for the sender used for estimation of the intention (step S33). Since the expression of the intention from the feature amount of the nonverbal information depends on the person, the intention estimation unit 22 builds the nonverbal expression model 210 for the sender. The structure of the nonverbal expression model 210 is the same regardless of the person, and is implemented by layers of an input layer, an LSTM layer, and an estimation layer. As preprocessing, the intention estimation unit 22 inputs the feature amount of the nonverbal information extracted in step S26 to the nonverbal expression model 210. Using the feature amounts of the plurality of frame images in the input video as an input, the intention estimation unit 22 outputs an intention and a frame number in each frame by the LSTM layer of the nonverbal expression model. The frame number indicates the ordinal number of an input frame among a plurality of frames indicating intentions.

The nonverbal expression model 210 is a learning model indicating a relation between an intention and a feature amount of nonverbal information, and has a structure such as a database, for example. In the disclosure, the database is referred to as an "intention-feature database" for the sake of explanatory convenience. FIG. 8 is a conceptual diagram illustrating an example of the intention-feature database corresponding to the nonverbal expression model. As illustrated in FIG. 8, the feature amounts of the nonverbal information have time-series values for each intensity of the intention (1.0, 0.8, 0.5, in this example). Further, for the feature amounts ((1) to (7) illustrated in FIG. 8) of the nonverbal information, there are stochastically four possible time-series values for each intensity of the intention (occurrence probability: 0.3, 0.25, 0.25, 0.2).

For example, the parameter (1) corresponding to AU1 (ActionUnit1) is expressed by the following Equation 2. Parameter (1) includes a value for N frames (for example, N=10) for each of the four occurrence probabilities, as indicated in Equation 2. The other parameters (2) to (7) are also expressed as in Equation 2 in substantially the same manner as the parameter (1). Accordingly, for example, when only one frame having the occurrence probability of 0.3 is extracted for the parameters (1) to (7), the following Equation 3 is obtained.

$$(1) = \{\{0.3, 0.3, 0.2, \ldots\}_{0.3}, \{0.3, 0.3, 0.1, \ldots\}_{0.25}, \{0.3, 0.1, 0.2, \ldots\}_{0.25}, \{0.3, 0.3, 0.0\}_{0.2}\} \quad \text{Equation 2}$$

$$\{(1), (2), (3), (4), (5), (6), (7)\} = \{0.3, 0.2, 0.6, 0.1, 0.1, 0.5, 0.5\} \quad \text{Equation 3}$$

Next, the intention estimation unit 22 reads the data set created by the processes of step S31 and step S32 to learn the nonverbal expression model 210 (step S34). Thus, the model learning unit 26 learns the nonverbal expression model 210 used for estimating the intention. Since expression of an intention from a feature amount of nonverbal information depends on the person, learning of the nonverbal expression model 210 is performed for each person.

Next, since the expression of an intention from the feature amount of nonverbal information depends on the person, the intention estimation unit 22 reads the nonverbal expression model 210 for the sender learned in step S33 and step S34 (step S35). Then, the intention estimation unit 22 estimates the intention of the sender based on the nonverbal information indicated by the video data acquired in step S1 (step S36). The estimated intention includes multidimensional information such as the type, strength, or certainty factor of the intention. The intention estimation unit 22 acquires the intention label information, which is an estimated value of the intention, obtained by, inputting video data of the sender to the nonverbal expression model 210 for the sender, for example. The intention estimation unit 22 stores information on the estimated intention in the intention storage unit 32.

Thus, the intention estimation unit 22 estimates the intention of the sender based on the video data of the sender and the nonverbal expression model for the sender, to estimate the intention in consideration of differences in expression of the nonverbal information between individuals or between cultures.

Feature Amount Conversion Process

Figure 9:
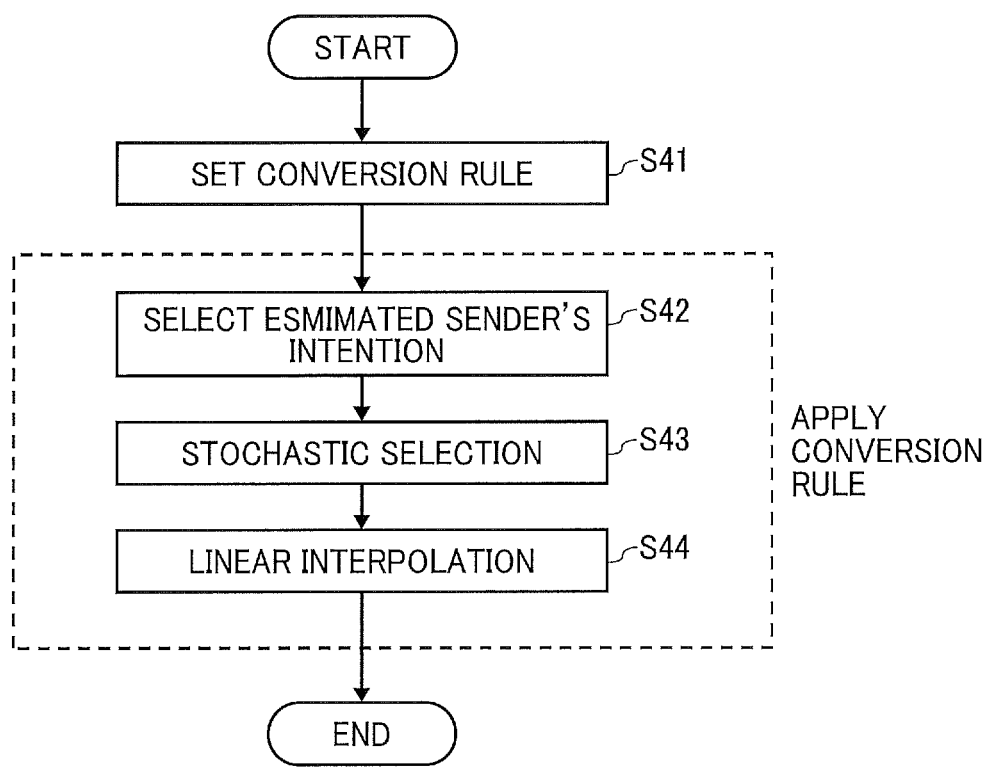
FIG. 9 is a flowchart illustrating an example of a feature amount conversion process, according to an embodiment of the present disclosure.

Next, referring to FIG. 9, FIG. 10A, and FIG. 10B, the process of converting the feature amount performed by the nonverbal information processing unit 12 of the information processing apparatus 10 in step S4 is described. FIG. 9 is a flowchart illustrating an example of the feature amount conversion processes.

First, the conversion rule setting unit 24 sets a conversion rule for conversion of the nonverbal information (step S41). The conversion rule set by the conversion rule setting unit 24 includes items of a conversion item, a conversion ratio, a conversion destination, and the intention-feature database (see FIG. 8) corresponding to the nonverbal expression model 210 of the conversion destination.

The conversion item indicates a type of a feature amount of the nonverbal information to be converted. Examples of the type of the feature amount of the nonverbal information include, but are not limited to, posture information, line-of-sight information, intensity of a facial expression for each emotion, and a head rotation angle. In the disclosure, the posture information refers to only a position corresponding to a backbone among the skeleton landmarks of the feature amount of the nonverbal information. Since the conversion item does not include all of the facial landmarks and the skeleton landmarks, individual differences in face and physique are maintained while back muscle and a line of sight are converted.

The conversion ratio is a ratio indicating how much the conversion item is to be converted to resemble the conversion destination. The conversion ratio is defined by a numerical value from 0 to 1. For example, "1" is selected to make the conversion item is to resemble the person A, and "0" is selected to maintain the state before conversion.

Further, the conversion destination indicates a person who is the conversion destination. In the embodiment, for example, the person A, who practices behavior that gives a better impression than the sender is set as the conversion destination. Then, the relation between the intention of the person A and the feature amount of the nonverbal information is defined as the intention-feature database corresponding to the nonverbal expression model 210. The relation is defined by building and learning the nonverbal expression model 210 of the person A in substantially the same manner as the processes illustrated in FIG. 7. For example, the relation is defined by inputting video of the person A and performing the annotation processing by the person A of annotating an intention corresponding to each frame of the input video, in substantially the same manner as the creation of the data set performed in step S31 and step S32. The intention-feature database corresponding to the nonverbal expression model 210 of the person A has the same structure as the example illustrated in FIG. 8. However, the parameters are different from those of the nonverbal expression model of the sender.

Then, the feature conversion unit 23 applies the conversion rule set in step S41 to convert the feature amount by processes from step S42 to step S44. Specifically, the feature conversion unit 23 selects the sender's intention estimated by the process of step S3 (step S42). The feature conversion unit 23 selects the type of intention, the intensity, and the frame number from the video data of the sender according to the estimated intention. For example, the feature conversion unit 23 selects the intention whose intensity is largest as the intention of the frame. In a case that there are a plurality of intentions having the largest value as in Equation 1 described above, both of the intentions having the largest value are selected. Then, linear interpolation described below is performed to calculate a feature amount of nonverbal information between the selected intentions. In this case, the ratio is 0.5 for both intentions. The feature conversion unit 23 selects rows (records) of the corresponding intention from the nonverbal expression model illustrated in FIG. 8, and selects a feature amount of nonverbal information of the corresponding frame number from the corresponding rows (records).

Next, the feature conversion unit 23 stochastically selects (stochastic selection) one of four possible time-series values as indicated in Equation 2 described above (step S43). Then, the feature conversion unit 23 performs linear interpolation of the feature amounts of the nonverbal information of the sender and the conversion destination using the following Equation 4 according to the conversion ratio indicated in the conversion rule set in step S41 (step S44). In Equation 4, X1 represents the feature amount of the nonverbal information of the sender, X2 represents the feature amount of the nonverbal information of the conversion destination, and α represents the conversion ratio.

$$X = \alpha \times X1 + (1-\alpha) \times X2 \quad \text{Equation 4}$$

FIG. 10 a table indicating an example of parameters of the feature amounts of nonverbal information to be input. FIG.

10A indicates an example of a part of parameters of the feature amounts of the nonverbal information extracted from video data of the sender before conversion and a frame number estimated therefrom. For example, the feature conversion unit 23 converts the feature amount based on the intention-feature database illustrated in FIG. 8 corresponding to the nonverbal expression model using the parameters indicated in FIG. 10A as an input.

For example, it is assumed that the feature conversion unit 23 selects {Neutral, 1.01} as the intention of the sender in step S42, and stochastically selects the time-series value { }$_{0.3}$ in step S43. Further, it is assumed that the conversion items indicated in the set conversion rule are only (4) to (7) illustrated in FIG. 8, and the conversion ratio is $\alpha=1.0$. FIG. 10B is a table indicating an example of parameters of the feature amounts of the nonverbal information converted in this case. As indicated in FIG. 10B, the parameters (4) to (7) are converted from the parameters of FIG. 10A, while the parameters (1) to (3) remain unchanged from the parameters before conversion. In other words, the feature conversion unit 23 converts only the values of the posture and the line-of-sight direction without changing the facial expression of the sender.

Thus, the feature conversion unit 23 converts the parameters of the feature amount of the nonverbal information based on the estimated value of the intention estimated by the intention estimation unit 22 and the conversion rule set by the conversion rule setting unit 24 so as to increase the probability that the intention of the sender is correctly communicated to the recipient.

Video Data Conversion Process

Figure 11:
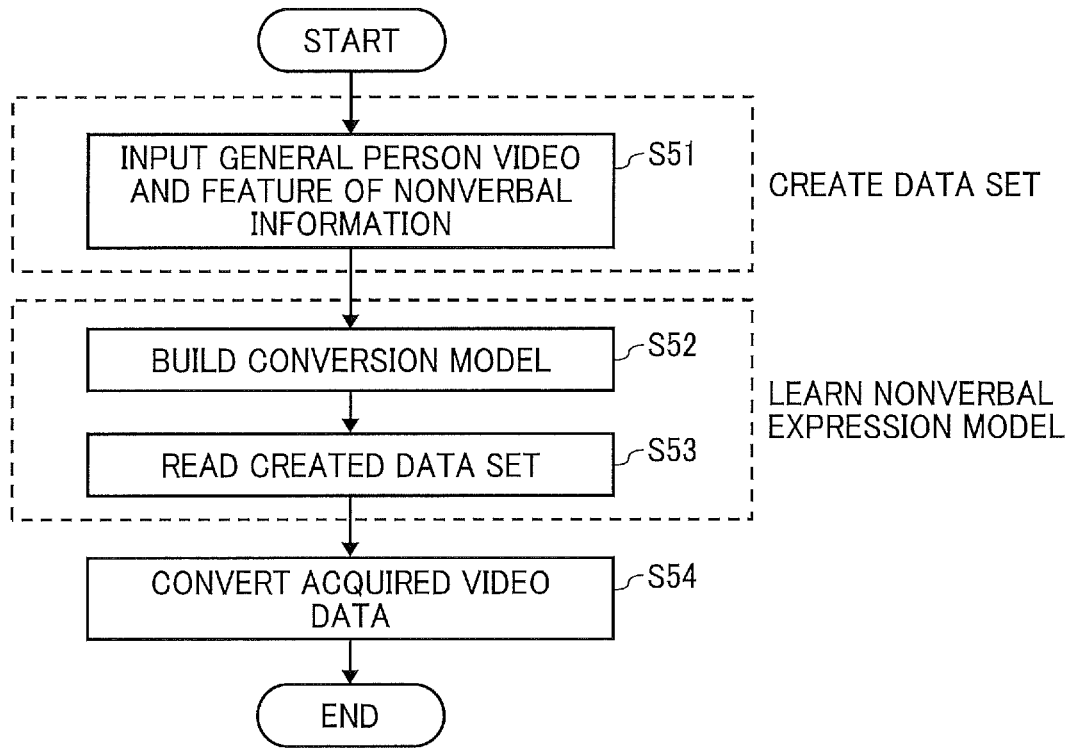
FIG. 11 is a flowchart illustrating an example of a video data conversion process, according to an embodiment of the present disclosure.

Next, referring to FIG. 11, the process of converting the video data performed by the nonverbal information processing unit 12 of the information processing apparatus 10 in step S5 is described. FIG. 11 is a flowchart illustrating an example of the video data conversion processes.

First, the video conversion unit 25 inputs general person video and a feature amount of nonverbal information corresponding to the general person video (step S51). The general person video that is input in step S51 is mainly video obtained by capturing the general person's motion of changing only the feature amount of nonverbal information variously. Examples of the motion of changing only the feature amount include, but are not limited to, a motion of changing the direction of the line of sight and a motion of changing the direction of the head. In this case, the label information is not required. Thus, the video conversion unit 25 creates a data set for performing the conversion process of the video data. The video conversion unit 25 stores the created data set in the data storage unit 31.

Next, the video conversion unit 25 builds the conversion model 240 for converting the video data (step S52). The conversion model 240 is obtained by extending the GANimation method described in A. Pumarola, et al., "Ganimation: Anatomically-aware facial animation from a single image", ECCV, 2018, not only to facial expression but also to posture and line-of-sight information of a person. GANimation is a technology that inputs, to an image generation network, an intensity group of action unit (AU) feature amounts, which are facial expression labels, in addition to input video, to convert the video to video having a desired facial expression label. The conversion model 240 is implemented by extending the GANimation method to a feature quantity of nonverbal information in addition to the AU feature amount.

The video conversion unit 25 inputs a set of "video before conversion, feature amount of nonverbal information before conversion, and feature amount of desired nonverbal information obtained by conversion" to the conversion model 240, and outputs a set of "video after conversion, and feature amount of nonverbal information obtained by conversion". This configuration is different from a general-purpose generative adversarial network (GAN) in that desired label information obtained by conversion is also input. The loss function is calculated by a mean squared error between the feature amounts of video obtained by conversion and nonverbal information obtained by conversion and the feature amounts of desired video and nonverbal information.

Next, the video conversion unit 25 reads the data set created by the process of step S51 to learn the conversion model 240 (step S53). Thus, the model learning unit 26 learns the conversion model 240 used for converting the video data. Since the conversion of the video data does not change depending on the person, it is enough that the learning of the conversion model 240 is performed once. In another example, in a case that the conversion model 240 that has already been learned is present, the processes of step S52 and step S53 are omitted.

Next, based on the conversion model read in step S53, the video conversion unit 25 converts the video data acquired in step S1 (step S54). The video conversion unit 25 converts the video data for each frame. The video conversion unit 25 stores, in the synthesis information storage unit 33, the conversion data, which is synthesis information obtained by synthesizing the video and the intention label information.

Thus, the video conversion unit 25 converts the video data of the sender so as to increase the probability that the estimated value of the intention estimated by the intention estimation unit 22 is correctly communicated to the recipient based on the nonverbal expression model 210.

As described, the nonverbal information conversion system 1A according to the first embodiment estimates the intention of the sender based on the video data of the sender and the nonverbal expression model for the sender, and converts the video data of the sender based on the estimated intention of the sender and the conversion rule that is based on the nonverbal expression model of a person who expresses nonverbal information in easy-to-understand manner. Thus, the nonverbal information conversion system 1A according to the first embodiment improves the conversion accuracy of nonverbal information for intelligibly communicating the intention that the sender wants to communicate to the recipient in a dialogue between the sender and the recipient.

Second Embodiment

Referring to FIG. 12, FIG. 13A, and FIG. 13B, a nonverbal information conversion system 1B is described according to the second embodiment. The same configurations and the same functions as those in the first embodiment are denoted by the same reference numerals, and redundant descriptions thereof are omitted below. FIG. 12 is a schematic diagram illustrating an example of the nonverbal information conversion system 1B according to the second embodiment. The nonverbal information conversion system 1B according to the second embodiment is different from the nonverbal information conversion system 1A according to the first embodiment in that conversion of nonverbal information is performed using the nonverbal expression model of the sender and a specific correction value used for conversion in dialogue communication between the sender and the recipient. The nonverbal information conversion system 1B according to the second embodiment sets the conversion rule by directly designating an item to be corrected and a correction guidance value instead of selecting a specific person as a conversion destination when converting the feature amount in step S4.

A description is now given of the feature amount conversion process of step S4 according to the second embodiment, the process being performed in a different way from the first embodiment. In the second embodiment, the conversion rule set by the conversion rule setting unit 24 in step S41 includes a conversion item, a value of the conversion item, and a conversion ratio. The conversion item indicates a type of a nonverbal information feature amount to be changed. The correction guidance value is provided as a value of the conversion item. For example, the conversion item and the correction guidance value are posture information (0.0, 0.0) and line-of-sight information (0.0, 0.0). The conversion ratio is a ratio indicating how much the conversion item is to be converted to be similar to the conversion destination. As the conversion ratio, a relatively small value is defined in order to smoothly perform video conversion. The conversion ratio is, for example, "0.5".

FIG. 13A and FIG. 13B indicate an example in which the conversion rule set in step S41 is applied in the second embodiment. FIG. 13A is a table indicating an example of a parameter of a feature amount of nonverbal information to be input. FIG. 13B is a table indicating an example of a parameter of a feature amount of nonverbal information obtained by conversion. The feature conversion unit 23 converts the feature amounts based on the conversion rule set in step S41 using the parameters indicated in FIG. 13A as an input, for example.

As indicated in FIG. 13B, the parameters of (4) to (7) are closed to the correction guidance value indicated in the conversion rule from the parameter of FIG. 13A, while the parameters of (1) to (3) remain unchanged from the parameters before conversion. In other words, the feature conversion unit 23 performs conversion so that, for example, the posture and the line of sight are close to the correction guidance value of correction regardless of the intention.

As described, the nonverbal information conversion system 1B according to the second embodiment converts the video data of the sender based on the conversion rule using the estimated intention of the sender and the correction guidance value of the conversion item. Thus, the nonverbal information conversion system 1B according to the second embodiment converts nonverbal information by designating a specific numerical value of an item to be converted, thereby converting the nonverbal information without being affected by the intention of the nonverbal information.

Third Embodiment

Referring to FIG. 14, the nonverbal information conversion system 1C is described according to the third embodiment. The same configurations and the same functions as those in the above-described embodiments are denoted by the same reference numerals, and redundant descriptions thereof are omitted below. FIG. 14 is a schematic diagram illustrating an example of the nonverbal information conversion system 1C according to the third embodiment. The nonverbal information conversion system 1C according to the third embodiment is different from the nonverbal information conversion system 1A according to the first embodiment in that conversion of nonverbal information is performed using the nonverbal expression model of the sender and a nonverbal expression model of a general person in dialogue communication between the sender and the recipient. The nonverbal information conversion system 1C according to the third embodiment sets the conversion rule by designating a general person as a conversion destination when converting the feature amount in step S4. The general person refers to a person having an intention-feature database corresponding to an average nonverbal expression model.

A description is now given of the feature amount conversion process of step S4 according to the third embodiment, the process being performed in a different way from the first embodiment. In the third embodiment, the conversion rule set by the conversion rule setting unit 24 in step S41 includes items of a conversion item, a conversion ratio, a conversion destination, and the intention-feature database (see FIG. 8) corresponding to the nonverbal expression model 210 of the conversion destination. The conversion item indicates a type of a feature amount of the nonverbal information to be converted. Examples of the type of the feature amount of the nonverbal information include, but are not limited to, posture information, line-of-sight information, intensity of a facial expression for each emotion, and a head rotation angle.

The conversion ratio is a ratio indicating how much the conversion item is to be converted to resemble the conversion destination. The conversion ratio is defined by a numerical value from 0 to 1. For example, "1" is selected to make the conversion item is to resemble the person as the conversion destination, and "0" is selected to maintain the state before conversion. In the embodiment, for example, "1" is defined as the conversion ratio so that the conversion item resembles the general person.

Further, the conversion destination indicates a person who is the conversion destination. In the embodiment, the general person is set as the conversion destination. The conversion rule setting unit 24 defines a relation between an intention of the general person and the feature amount of the nonverbal information as the intention-feature database corresponding to the nonverbal expression model 210. The relation is defined by building and learning the nonverbal expression model 210 of the general person in substantially the same manner as the processes illustrated in FIG. 7. For example, the relation is defined by inputting video of a desired person and performing the annotation processing by the person himself/herself of annotating an intention corresponding to each frame of the input video, in substantially the same manner as the creation of the data set performed in step S31 and step S32. The nonverbal information processing unit 12 performs this definition of the relation a plurality of times and obtains an average of the respective feature amounts, to create the average as the intention-feature database corresponding to the nonverbal expression model 210 of the general person. The feature conversion unit 23 applies the conversion rule thus set by the conversion rule setting unit 24 to convert the feature amount. The processes after step S41 are performed in the same or substantially the same manner as described above referring to step S42 to step S44 in the first embodiment.

As described, even in a case that the nonverbal information conversion system 1C according to the third embodiment converts video data of the sender is based on the estimated intention of the sender and the conversion rule that is based on the nonverbal expression model of the general person, the nonverbal information conversion system communicates the intention that the sender wants to communicate to the recipient in an easy-to-understand manner.

Fourth Embodiment

Figure 15:
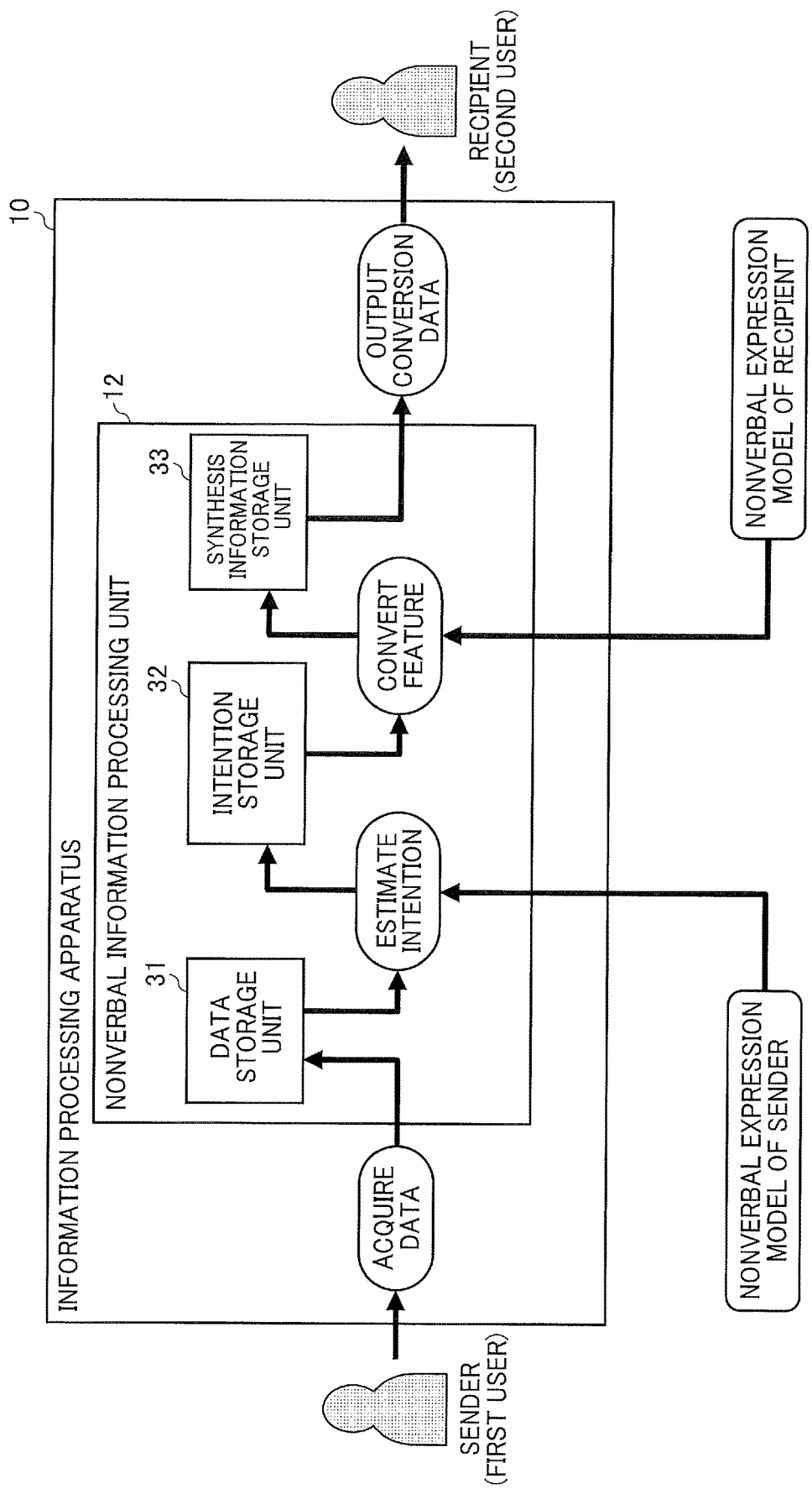
FIG. 15 is a schematic diagram illustrating an example of a nonverbal information conversion system, according to the fourth embodiment.
Figure 16:
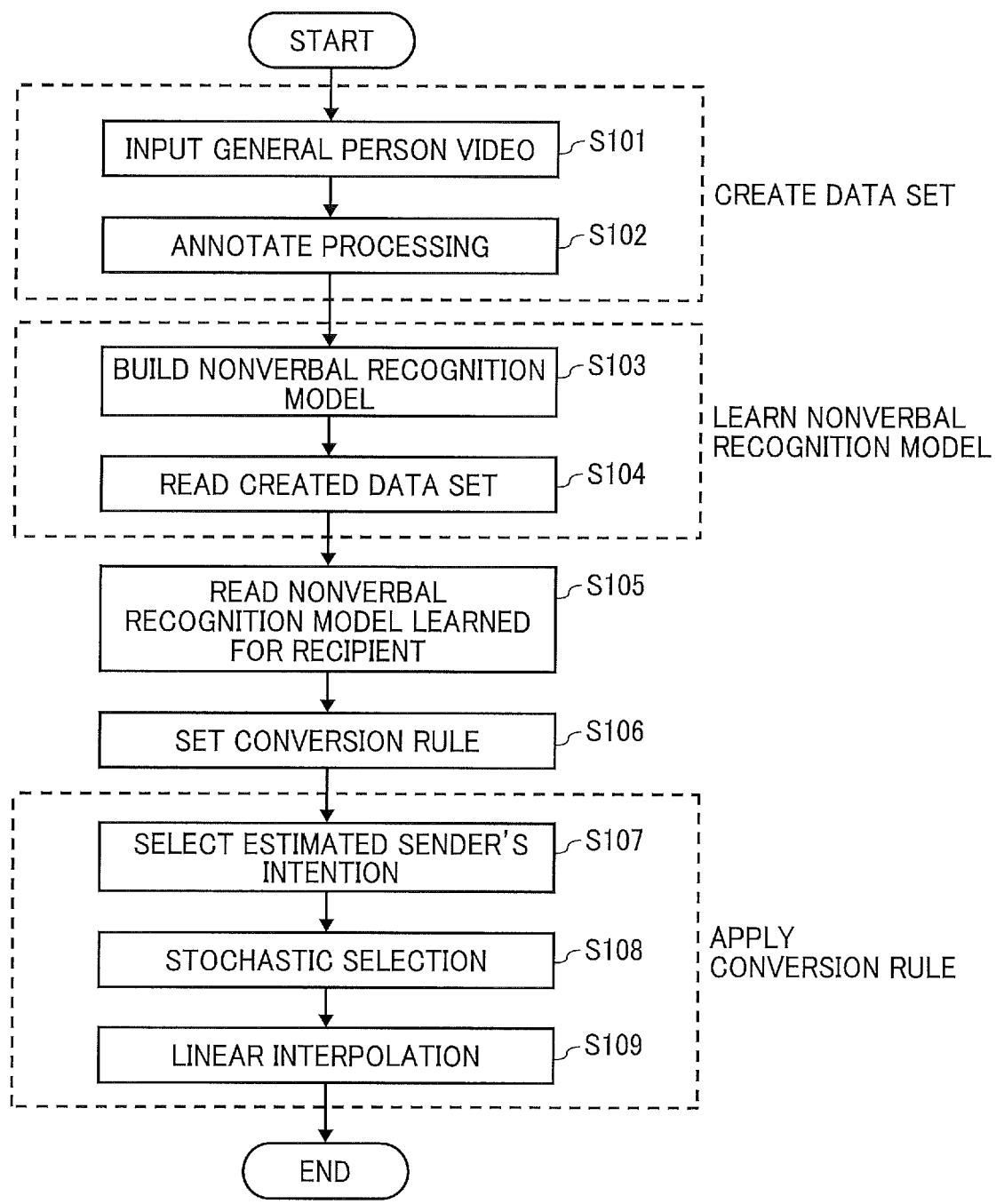
FIG. 16 is a flowchart illustrating an example of a feature amount conversion process, according to the fourth embodiment.

Referring to FIG. 15 and FIG. 16, a nonverbal information conversion system 1D is described according to the fourth embodiment. The same configurations and the same functions as those in the above-described embodiments are denoted by the same reference numerals, and redundant descriptions thereof are omitted below. FIG. 15 is a schematic diagram illustrating an example of the nonverbal information conversion system 1D according to the fourth embodiment. The nonverbal information conversion system 1D according to the fourth embodiment is different from the nonverbal information conversion system 1A according to the first embodiment in that conversion of nonverbal information is performed using the nonverbal expression model of the sender and a nonverbal recognition model of the recipient in dialogue communication between the sender and the recipient. The nonverbal information conversion system 1D according to the fourth embodiment converts a feature amount of nonverbal information of the sender by using the nonverbal recognition model of the recipient when performing the conversion process of the feature amount in step S4 so as to make it easy for the recipient to recognize the intention.

A detailed description is now given of the feature amount conversion process of step S4 according to the fourth embodiment, the process being performed in a different way from the first embodiment. FIG. 16 is a flowchart illustrating an example of the feature amount conversion processes according to the fourth embodiment.

First, the feature conversion unit 23 inputs a general person video, which is video obtained by capturing a person who is different from the sender and the recipient (step S101). The general person video is video obtained by capturing a third party person (general person), who is different from the sender and the recipient. The general person video includes mainly video obtained by capturing actions performed by the general person in daily communication. Next, the feature conversion unit 23 performs an annotation processing using the general person video input in step S101 (step S102). The feature conversion unit 23 defines an intention corresponding to the general person video as the intention label information by, for example, an input operation to the keyboard 111 by an annotator. This intention label information is the same or substantially the same as the example indicated in Equation 1 described above.

Further, the annotate in step S102 is assumed to be performed by the recipient himself/herself (annotator=recipient) and defines the type and intensity of the intention as indicated in Equation 1, for example. The annotator reproduces, for example, the video data input in step S101 and inputs a numerical value of the intensity of the intention in each frame of the video. In the annotation processing, for example, a dedicated application is used to allow the annotator to specify the numerical value of the intensity of the intention in each frame by a drag operation using an input device such as the pointing device 112, thereby reducing workload of the annotation processing. In another example, the annotation is performed by specifying various types or multidimensional information such as the type or certainty factor of the intention in addition to specifying the numerical value of the strength of the intention by the drag operation or the like using the input device such as the pointing device 112. Thus, the feature conversion unit 23 creates a data set used for the feature amount extraction process. The feature conversion unit 23 stores the created data set in the data storage unit 31.

Next, the feature conversion unit 23 builds the nonverbal recognition model 220 for the recipient used for feature amount conversion (step S103). Since the recognition of the intention from the feature amount of the nonverbal information depends on the person, the feature conversion unit 23 builds the nonverbal recognition model 220 for the recipient. The structure of the nonverbal recognition model 220 is the same regardless of the person, and is implemented by layers of an input layer, an LSTM layer, and an estimation layer. As preprocessing, the feature conversion unit 23 inputs the feature amount of the nonverbal information extracted in step S26 to the nonverbal recognition model 220. Using the feature amounts of the plurality of frame images in the input video as an input, the feature conversion unit 23 outputs an intention and a frame number in each frame by the LSTM layer of the nonverbal recognition model 220. The frame number indicates the ordinal number of an input frame among a plurality of frames indicating intentions.

The nonverbal recognition model 220 is a learning model indicating a relation between nonverbal recognition and expression, and has a structure such as a database, for example. In the embodiment, the database is referred to as an "intention-feature database", for the sake of explanatory convenience. The intention-feature database corresponding to the nonverbal recognition model 220 has the same structure as the structure of the intention-feature database of the nonverbal expression model 210 illustrated in FIG. 8.

Next, the feature conversion unit 23 reads the data set created by the process of step S101 and step S102 to learn the nonverbal recognition model 220 (step S104). Thus, the model learning unit 26 learns the nonverbal recognition model 220 used for converting the feature amount. Since recognition of an intention from a feature amount of nonverbal information depends on the person, learning of the nonverbal recognition model 220 is performed for each person. Next, since the recognition of an intention from the feature amount of nonverbal information depends on the person, the feature conversion unit 23 reads the nonverbal recognition model 220 for the recipient learned in step S103 and step S104 (step S105).

Next, the conversion rule setting unit 24 sets a conversion rule for conversion of the nonverbal information (step S106). The conversion rule set by the conversion rule setting unit 24 includes items of a conversion item, a conversion ratio, and the intention-feature database (see FIG. 8) corresponding to the nonverbal recognition model 220 of the conversion destination.

The conversion item and the conversion ratio indicate a type of a feature amount of the nonverbal information to be converted. Examples of the type of the feature amount of the nonverbal information include, but are not limited to, posture information, line-of-sight information, intensity of a facial expression for each emotion, and a head rotation angle. The conversion ratio is a ratio indicating how much the conversion item is to be converted to resemble the conversion destination. The conversion ratio is defined by a numerical value from 0 to 1. For example, the value 1 is selected to make the conversion item is to resemble the recipient, and the value 0 is selected to maintain the state before conversion. Further, the relation between an intention that is easy for the recipient to recognize and the feature amount of the nonverbal information is defined as the intention-feature database corresponding to the nonverbal recognition model 220 build by the processes from step S101 to step S105.

Then, the feature conversion unit 23 applies the conversion rule set in step S106 to convert the feature amount by processes from step S107 to step S109. Processes from step S107 to step S109 are performed in the same or substantially the same manner as described above referring to step S42 to step S44 of FIG. 9, and the redundant descriptions are omitted.

As described above, the nonverbal information conversion system 1D according to the fourth embodiment converts the video data of the sender based on the estimated sender's intention and the conversion rule that is based on the nonverbal recognition model of the recipient. Thus, the nonverbal information conversion system 1D according to the fourth embodiment uses both an intention that the sender wants to communicate and the recipient's recognition of nonverbal information, thereby improving the conversion accuracy of nonverbal information for intelligibly communicating the intention that the sender wants to communicate to the recipient.

As described, the nonverbal information conversion system 1 (1A, 1B, 1C, 1D) uses the nonverbal expression model and the nonverbal recognition model, each of which differs depending on the person, to convert nonverbal information represented by video data of the sender. With this configuration, the nonverbal information conversion system 1 converts the nonverbal information in consideration of individuality in expression and recognition of nonverbal information. Thus, the nonverbal information conversion system 1 (1A, 1B, 1C, 1D) converts nonverbal information in consideration of individuality of each person in dialogue communication, thereby intelligibly communicating an intention that the sender wants to communicate to the recipient.

According to one or more embodiments, a non-transitory computer-executable medium storing a program storing instructions is provided, which, when executed by a processor of an information processing apparatus, causes the information processing apparatus to perform an information processing method. The information processing method includes estimating an intention indicated in first nonverbal information, which is nonverbal information of a first user, based on a feature amount of the first nonverbal information and a nonverbal expression model indicating a relation between the first nonverbal information and an intention. The information processing method includes converting the first nonverbal information into second nonverbal information to be output to a second user based on the estimated intention and a set conversion rule of the nonverbal information.

Since there are differences in recognition and expression of nonverbal information between individuals and between cultures, estimation and expression are to be performed according to individuals. However, according to the conventional method, there is room for improvement in converting nonverbal information in consideration of individuality in expression and recognition of nonverbal information.

According to one or more embodiments of the present disclosure, in dialogue communication, nonverbal information is converted so that one's intention to be communicated to the other party of the dialogue is intelligibly communicated.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), system on a chips (SOCs), graphics processing units (GPUs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Although the information processing apparatus, the nonverbal information conversion system, the information processing method, and the program according to embodiments of the present invention have been described above, the above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An information processing apparatus, comprising circuitry configured to:
   estimate an intention indicated in first nonverbal information, which is nonverbal information of a first user, based on a feature of the first nonverbal information and a first nonverbal expression model for the first user, the first nonverbal expression model indicating a relation between the first nonverbal information and a first user intention; and
   convert the first nonverbal information into second nonverbal information to be output to a second user based on the estimated intention and a set conversion rule of the nonverbal information, wherein the conversion rule is set based on a second nonverbal expression model for the second user, the second nonverbal expression model indicating a relation between the second nonverbal information and a second user intention.

2. The information processing apparatus of claim 1, wherein the circuitry is further configured to
   acquire video data obtained by capturing the first user,
   output conversion data obtained by converting the acquired video data,
   estimate the intention based on the first nonverbal information indicated in the video data,
   convert the video data indicating the first nonverbal information into the conversion data indicating the second nonverbal information, and
   output a video represented by the conversion data to a reception apparatus used by the second user.

3. The information processing apparatus of claim 2, wherein
   the first nonverbal expression model is a model that learns individuality of the first user in nonverbal expression, and
   the circuitry calculates an estimated value of the intention, the estimated value being obtained by inputting the acquired video data to the nonverbal expression model.

4. The information processing apparatus of claim 3, wherein the set conversion rule is set based on a nonverbal recognition model indicating a relation between nonverbal recognition of the second user and an expression.

5. The information processing apparatus of claim 4, wherein
the nonverbal recognition model is a model that learns individuality in the nonverbal recognition of the second user, and
the circuitry converts the acquired video data so as to increase a probability that the calculated estimated value of the intention is correctly transmitted to the second user based on the nonverbal recognition model.

6. The information processing apparatus of claim 4, wherein
the circuitry is further configured to perform a feature extraction on the nonverbal information, and
the first and second nonverbal expression models and the nonverbal recognition model are adjusted to perform desired recognition of the nonverbal expression and conversion of the nonverbal recognition based on a parameter derived from the feature extraction.

7. The information processing apparatus of claim 6, wherein the first and second nonverbal expression models and the nonverbal recognition model are adjusted according to a relation between the first user and the second user based on the parameter of the extracted feature amount.

8. The information processing apparatus of claim 1, wherein the conversion rule is set based on a third nonverbal expression model of a third party-who is different from the first user and the second user.

9. The information processing apparatus of claim 1, wherein the nonverbal information includes at least one of a line of sight or a facial expression, a shape of a hand, an arm or a foot, and a posture.

10. The information processing apparatus of claim 1, wherein the intention indicates an emotion or will that the first user wants to communicate to the second user.

11. The information processing apparatus of claim 10, wherein the intention includes a type or intensity of the emotion, or the feature amount such as a line of sight or a posture of the first user.

12. An information processing method performed by an information processing apparatus, the information processing method comprising:
estimating an intention indicated in first nonverbal information, which is nonverbal information of a first user, based on a feature of the first nonverbal information and a first nonverbal expression model for the first user, the first nonverbal expression model indicating a relation between the first nonverbal information and a first user intention; and
converting the first nonverbal information into second nonverbal information to be output to a second user based on the estimated intention and a set conversion rule of the nonverbal information, wherein the conversion rule is set based on a second nonverbal expression model for the second user, the second nonverbal expression model indicating a relation between the second nonverbal information and a second user intention.

13. An information processing apparatus, comprising circuitry configured to:
estimate a provider's state of being indicated in first nonverbal information, which is nonverbal information of a provider, based on a first model generated based on information input by the provider for the provider, the first model indicating a relation between the first nonverbal information and the provider's state of being; and
convert the first nonverbal information into second nonverbal information to be output to a recipient based on the estimated provider's state of being and a set conversion rule of the nonverbal information, wherein the conversion rule is set based on a second model generated based on information input by the recipient for the recipient, the second model indicating a relation between the second nonverbal information and a recipient's state of being indicated in the second nonverbal information.

* * * * *